(12) United States Patent
Saffar et al.

(10) Patent No.: US 11,738,542 B2
(45) Date of Patent: Aug. 29, 2023

(54) RECYCLE-READY RETORTABLE LAMINATED POLYESTER-BASED GUSSETED POUCHES

(71) Applicant: ProAmpac Holdings Inc., Cincinnati, OH (US)

(72) Inventors: Amir Saffar, Montreal (CA); Seyed Hesamoddin Tabatabaei, Mason, OH (US); Manuel Jaggi, Urtenen-Schönbühl (CH); Adrian Haeberli, Solothrun (CH)

(73) Assignee: ProAmpac Holdings Inc., Cincinnati, OH (US)

( * ) Notice: Subject to any disclaimer, the term of this patent is extended or adjusted under 35 U.S.C. 154(b) by 81 days.

(21) Appl. No.: 17/339,426

(22) Filed: Jun. 4, 2021

(65) Prior Publication Data
US 2021/0394496 A1    Dec. 23, 2021

Related U.S. Application Data

(60) Provisional application No. 63/127,925, filed on Dec. 18, 2020, provisional application No. 63/041,357, filed on Jun. 19, 2020.

(51) Int. Cl.
*B32B 27/08* (2006.01)
*B65D 65/40* (2006.01)
(Continued)

(52) U.S. Cl.
CPC .............. *B32B 27/08* (2013.01); *B32B 1/00* (2013.01); *B32B 7/12* (2013.01); *B32B 27/36* (2013.01);
(Continued)

(58) Field of Classification Search
CPC .......... B32B 27/08; B32B 1/00; B32B 1/712; B32B 27/36; B32B 2250/244;
(Continued)

(56) References Cited

U.S. PATENT DOCUMENTS 3,935,993 A    2/1976    Doyen et al.
4,702,963 A    10/1987   Phillips et al.
(Continued)

FOREIGN PATENT DOCUMENTS

EP    1466725 A1    10/2014
JP    2006150617 A   6/2006
(Continued)

OTHER PUBLICATIONS

Nisticò, "Polyethylene terephthalate (PET) in the packaging industry," Polymer Testing, vol. 90, pp. 1018 (Jul. 28, 2020).
(Continued)

*Primary Examiner* — Michael C Miggins
(74) *Attorney, Agent, or Firm* — McLane Middleton, Professional Association

(57) ABSTRACT

In one aspect, a pouch includes a first panel, a second panel, and a bottom gusset, wherein the first panel, second panel, and bottom gusset are formed of a polyester-based film structure and wherein the bending stiffness of the bottom gusset panel is less than or equal to 0.05 N/mm. Each of the polyester-based film structures may be formed of a polyester-based polymeric composition comprising polybutylene terephthalate (PBT), polyethylene terephthalate (PET), or a blend from 0-100% by weight of PBT in PET. It is contemplated that each polyester-based film structure may comprise two or more film plies laminated to each other.

27 Claims, 11 Drawing Sheets

(51) Int. Cl.
  *B65D 65/42* (2006.01)
  *B32B 1/00* (2006.01)
  *B32B 27/36* (2006.01)
  *B32B 7/12* (2006.01)
  *B65D 75/00* (2006.01)

(52) U.S. Cl.
  CPC .............. *B65D 65/40* (2013.01); *B65D 65/42* (2013.01); *B65D 75/008* (2013.01); *B32B 2250/244* (2013.01); *B32B 2255/10* (2013.01); *B32B 2255/20* (2013.01); *B32B 2270/00* (2013.01); *B32B 2307/31* (2013.01); *B32B 2307/7244* (2013.01); *B32B 2307/7246* (2013.01); *B32B 2439/46* (2013.01); *B32B 2439/70* (2013.01)

(58) Field of Classification Search
  CPC ............ B32B 2255/10; B32B 2255/20; B32B 2270/00; B32B 2307/31; B32B 2307/7244; B32B 2307/7246; B32B 2439/46; B32B 2439/70; B65D 65/40; B65D 65/42; B65D 75/008
  See application file for complete search history.

(56) References Cited

U.S. PATENT DOCUMENTS

| | | | |
|---|---|---|---|
| 4,898,477 A | 2/1990 | Cox et al. | |
| 5,491,018 A | 2/1996 | Maro et al. | |
| 6,224,528 B1 | 5/2001 | Bell | |
| 6,543,208 B1 | 4/2003 | Kobayashi | |
| 6,846,532 B1 | 1/2005 | Bensur | |
| 8,815,358 B2 | 8/2014 | Rasile | |
| 10,718,046 B2 | 7/2020 | Dabadie et al. | |
| 2006/0286349 A1 | 12/2006 | Klein et al. | |
| 2007/0092398 A1 | 4/2007 | McDonald | |
| 2007/0292567 A1 | 12/2007 | Kaas et al. | |
| 2015/0258757 A1 | 9/2015 | Ishizaki et al. | |
| 2017/0136747 A1 | 5/2017 | Torradas et al. | |
| 2018/0099494 A1 | 4/2018 | Goto et al. | |
| 2019/0352069 A1 | 11/2019 | Chen et al. | |
| 2020/0156359 A1 | 5/2020 | Goto | |
| 2020/0198841 A1 | 6/2020 | Tanaka et al. | |
| 2020/0290333 A1 | 9/2020 | Welvaert et al. | |
| 2020/0346446 A1 | 11/2020 | Kelly | |

FOREIGN PATENT DOCUMENTS

| | | |
|---|---|---|
| JP | 4684060 B2 | 5/2011 |
| WO | 1993014922 A1 | 8/1993 |
| WO | 2018062331 A1 | 4/2018 |

OTHER PUBLICATIONS

Struller et al., "Characterization studies of aluminum oxide barrier coatings on polymeric substrates," J. Vac. Sci. Technol. A, vol. 30, No. 4, pp. 041502-1-041502-8 (Apr. 27, 2021).
Machine Translation of WO2018062331A1.
Machine Translation of JP2006150617A.
Machine Translation of JP4684060B2.
International Search Report and Written Opinion received in PCT/2021/035899 dated Sep. 28, 2021.

RECYCLE-READY RETORTABLE LAMINATED POLYESTER-BASED GUSSETED POUCHES

CROSS REFERENCE TO RELATED APPLICATIONS

This application claims the priority benefit of U.S. provisional application No. 63/041,357 filed Jun. 19, 2020, and U.S. provisional application No. 63/127,925 filed Dec. 18, 2020. Each of the aforementioned application is incorporated herein by reference in its entirety.

BACKGROUND

The present disclosure relates to packaging articles and more particularly to a recycle-ready, high-barrier, laminated polyester-based gusseted pouch. The polyester-based gusseted pouches are formed of opposing panels having a film structure comprising two or more polyester film ply layers laminated together and a bottom gusset panel. In the preferred embodiments, the pouch is adapted for use as a retortable pouch; however, it is also contemplated that the pouches herein can advantageously be used as a barrier pouch for non-retort applications. The film structure has one or more polyester-based layers comprising polybutylene terephthalate (PBT), polyethylene terephthalate (PET), or a blend from 0-100% by weight of PBT in PET. At least one polyester-based layer is a high-barrier, ceramic-coated layer, where the ceramic coating comprises fully or partially oxidized aluminum, fully or partially oxidized silicon, or a blend thereof.

The pouches of this disclosure may be used for retort applications or any other application where a stand-up type pouch is desirable to protect consumable products from spoiling or prematurely degrading in various environments throughout the distribution and point of sale channels. Such packaging articles may be used for sterile packaging of human and pet food items, liquids, chemicals, health and medical products, beauty products, and other consumable product that needs to be protected from oxygen and moisture after retort process. In particularly preferred embodiments, the film structures may be used in the manufacture of a retortable pouch for the sterile packaging of food and drink handled by aseptic processing. Conventional film structures for retortable pouches commonly use a foil or nylon layer, which renders the packaging product unsuitable for recycling. In contrast, the film structures of the present packaging construction are substantially free of non-polyester-based polymers.

Flexible PET packaging films are more susceptible to damage, such as suffering punctures, during transport. While all-polyester packaging films have been developed that are suitable for non-gusseted food packaging bags, such as pillow shaped packaging bags, the development of an all-polyester gusseted pouch has been met with difficulty at numerous stages. For examples, difficulties arise in forming a hermetic seal, pushing a sealable layer of polyester sealant to flow and cover the space between gusset panels and side seal area (in some embodiments, referred to as the triple point), and filling packaging, due to the thickness and stiffness of the material, as well as maintaining integrity of material through retort processes. For example, U.S. Pat. No. 6,543,208 discloses a pillow shaped polyester film food packaging bag. The packaging bags of U.S. Pat. No. 6,543,208 are formed of a tubular bag having a longitudinal fin seal and transverse seals at each end. The films disclosed U.S. Pat. No. 6,543,208 have a seal initiation temperature of approximately 122 degrees C. (see FIG. 1 of U.S. Pat. No. 6,543,208). While such films are suitable for pillow shaped polyester film food packaging bags having a longitudinal fin seal and transverse end seals, such films are not suitable for gusseted pouches.

The present development overcomes these limitations by providing a retortable polyester film having a low bending stiffness in the gusseted portion, a low coefficient of friction, and low seal initiation temperatures. This results in a film suitable for forming hermetic, recycle-ready gusseted pouches capable of running on high-speed packaging lines. It will be recognized that the present development is not limited to retort packaging applications and is suitable for non-retort packaging applications.

The present disclosure provides an improved packaging article and method that overcomes the above-referenced problems and others.

SUMMARY

In one aspect, a pouch includes a first panel having an upper end, a lower end, an interior surface facing an interior of the pouch, and an exterior surface at an exterior of the pouch. A second panel is opposite the first panel, the second panel having an upper end, a lower end, an interior surface facing the interior of the pouch, and an exterior surface at the exterior of the pouch, the first and second panels cooperating to define at least a portion of a cavity, the upper ends of the first and second panels spaced apart from the lower ends of the first and second panels in an axial direction. A bottom gusset panel extends between the lower end of the first panel and the lower end of the second panel and defines a lower end of the cavity. The bottom gusset panel has an interior surface facing the interior of the pouch and an exterior surface at the exterior of the pouch, wherein the bottom gusset panel is folded along a fold line extending parallel to the lower ends of the first panel and the second panel when the pouch is empty, the fold line spaced apart from the lower ends of the first and second panels toward the upper ends of the first and second panels, wherein a first axial extent of the pouch between the lower ends of the first and second panels and the fold line defines a gusset region, and wherein a second axial extent of the pouch between the fold line and the upper ends of the first and second panels defines a non-gusset region. The bottom gusset panel is configured to permit the lower ends of the first and second panels to be spaced apart from each other to expand a lower end of the pouch when the cavity is at least partially filled. A first side seal region extends in the axial direction, wherein the first and second panels are sealed to each other along a first peripheral edge of the non-gusset region and wherein the first and second panels are sealed to the bottom gusset panel along a first peripheral edge of the gusset region. A second side seal region extends in the axial direction and transversely opposite the first side seal region, wherein the first and second panels are sealed to each other along a second peripheral edge of the non-gusset region and wherein the first and second panels are sealed to the bottom gusset panel along a second peripheral edge of the gusset region. A first bottom seal region wherein the first panel is sealed to the bottom gusset panel along a bottom peripheral edge of the gusset region. A second bottom seal region wherein the second panel is sealed to the bottom gusset panel along the bottom peripheral edge of the gusset region. A seal region at an upper end of the pouch is configured to close the cavity when sealed. The first panel, second panel, and bottom gusset panel are formed of a polyester-based film structure. The bending stiffness of the bottom gusset panel is less than or equal to 0.05 N/mm.

In a more limited aspect, one or more of the first panel, second panel, and bottom gusset panel are formed of a polyester-based film comprising a first ply which includes a first layer formed of a first polyester-based polymeric composition, wherein the first polyester-based polymeric composition comprises polybutylene terephthalate, polyethylene terephthalate, or a blend thereof. The first layer has a first surface and a second surface opposite the first surface. A second ply includes a second layer, the second layer having a first surface and a second surface opposite the first surface, and wherein the second layer is a sealable polyester layer. A third layer is formed of a second polyester-based polymeric composition, wherein the second polyester-based polymeric composition comprises polybutylene terephthalate, polyethylene terephthalate, or a blend thereof. An adhesive layer is interposed between the first ply and the second ply, the adhesive layer laminating the first ply to the second ply, wherein the first surface of the third layer faces the second surface of the first layer.

In a more limited aspect, each of the first ply and the second ply have a thickness in the range of about 9 microns to 100 microns.

In a more limited aspect, the sealable polyester layer has a thickness in the range of about 2 microns to 25 microns.

In a more limited aspect, the polyester-based film further includes a printed layer disposed intermediate the first layer and the adhesive layer.

In a more limited aspect, the first ply further includes a fourth layer formed of a ceramic coating, the fourth layer having a first surface and a second surface opposite the first surface, wherein the first surface of the fourth layer faces the second surface of the first layer. A fifth layer is interposed between the second layer and the printed layer.

In a more limited aspect, the second ply further includes a fourth layer formed of a ceramic coating, the fourth layer having a first surface and a second surface opposite the first surface, wherein the first surface of the fourth layer faces the adhesive layer. A fifth layer is interposed between the fourth layer and the third layer.

In a more limited aspect, the polyester-based film structure has a seal initiation temperature of less than or equal to 120° C.

In yet another more limited aspect, the polyester-based film structure has a seal initiation temperature of less than or equal to 100° C.

In a more limited aspect, the polyester-based film structure has a heat seal strength in the range of about 10 N/25 mm to about 100 N/25 mm, preferably about 15 N/25 mm to about 100 N/25 mm, and more preferably about 20 N/25 mm to about 100 N/25 mm.

In a more limited aspect, the polyester-based film structure has an ultrasonic seal strength in the range of about 10 N/25 mm to about 100 N/25 mm, preferably about 15 N/25 mm to about 100 N/25 mm, and more preferably about 20 N/25 mm to about 100 N/25 mm.

In a more limited aspect, the polyester-based film structure has a maximum seal strength in the range of about 10 N/25 mm to about 100 N/25 mm, preferably in the range of about 15 N/25 mm to about 32 N/25 mm, and more preferably about 20 N/25 mm to about 30 N/25 mm.

In a more limited aspect, the polyester-based film structure has a minimum seal strength of greater than or equal to 10 N/25 mm, preferably greater than or equal to 15 N/25 mm, and more preferably greater than or equal to 20 N/25 mm. In a more limited aspect, the minimum seal temperature to achieve the minimum seal strength is less than or equal to 115 degrees C., preferably less than or equal to 100 degrees C., more preferably less than or equal to 90 degrees C.

In a more limited aspect, the minimum seal temperature to achieve a seal strength of at least 10 N/25 mm is less than or equal to 115 degrees C., preferably less than or equal to 100 degrees C., more preferably less than or equal to 90 degrees C.

In a more limited aspect, the sealable polyester layer has a static coefficient of friction in the range of about 0.1 to 0.4 and a kinetic coefficients of friction in the range of about 0.1 to 0.4.

In a more limited aspect, the polyester-based film structure has an oxygen transmission rate of less than or equal to 0.1 cc/100 $in^2$/day (at 23 degrees C., 0% relative humidity) and a moisture vapor transmission rate of less than or equal to 0.1 g/100 $in^2$/day (at 38 degrees C., 90% relative humidity) before undergoing a retort process. In a further more limited aspect, the polyester-based film structure has an oxygen transmission rate of less than or equal to 0.05 cc/100 $in^2$/day (at 23 degrees C., 0% relative humidity) and a moisture vapor transmission rate of less than or equal to 0.05 g/100 $in^2$/day (at 38 degrees C., 90% relative humidity) before undergoing a retort process.

In a more limited aspect, the polyester-based film structure has an oxygen transmission rate of less than or equal to 0.1 cc/100 $in^2$/day (at 23 degrees C., 0% relative humidity) and a moisture vapor transmission rate of less than or equal to 0.1 g/100 $in^2$/day (at 38 degrees C., 90% relative humidity) after undergoing a retort process. In a further more limited aspect, the polyester-based film structure has an oxygen transmission rate of less than or equal to 0.05 cc/100 $in^2$/day (at 23 degrees C., 0% relative humidity) and a moisture vapor transmission rate of less than or equal to 0.05 g/100 $in^2$/day (at 38 degrees C., 90% relative humidity) after undergoing a retort process.

In a more limited aspect, each of the first and second panels are formed of a polyester-based film comprising a first ply which includes a first layer formed of a first polyester-based polymeric composition, wherein the first polyester-based polymeric composition comprises polybutylene terephthalate, polyethylene terephthalate, or a blend thereof. The first layer has a first surface and a second surface opposite the first surface. A second ply includes a second layer, the second layer having a first surface and a second surface opposite the first surface, and wherein the second layer is sealable polyester layer. A third layer is formed of a second polyester-based polymeric composition, wherein the second polyester-based polymeric composition comprises polybutylene terephthalate, polyethylene terephthalate, or a blend thereof. A third ply includes a fourth layer formed of a third polyester-based polymeric composition, the fourth layer having a first surface and a second surface opposite the first surface. An adhesive layer is interposed between the first ply and the third ply, the adhesive layer laminating the first ply to the third ply, wherein the first surface of the fourth layer faces the second surface of the first layer. A second adhesive layer is interposed between the second ply and the third ply, the second adhesive layer laminating the second ply to the third ply, wherein the second surface of the fourth layer faces the first surface of the third layer.

In a more limited aspect, the third polyester-based polymeric composition comprises polybutylene terephthalate, polyethylene terephthalate, or a blend thereof.

In a more limited aspect, the polyester-based film structure further includes a printed layer disposed intermediate the fourth layer and the second adhesive layer.

In a more limited aspect, each of the first ply, third ply, and second ply have a thickness in the range of about 9 microns to 100 microns.

In a more limited aspect, the sealable polyester layer has a thickness in the range of about 2 microns to 25 microns.

In a more limited aspect, a printed layer is disposed intermediate the second layer and the adhesive layer.

In a more limited aspect, the first ply further includes a fifth layer formed of a ceramic coating, the fifth layer having a first surface and a second surface opposite the first surface, wherein the first surface of the fifth layer faces second surface of the first. A sixth layer is interposed between the fifth layer and the printed layer.

In a more limited aspect, the second ply further includes a fifth layer formed of a ceramic coating, the fifth layer having a first surface and a second surface opposite the first surface, wherein the first surface of the fifth layer faces the second adhesive layer. A sixth layer is interposed between the fifth layer and the third layer.

In a more limited aspect, the sealable polyester layer has a static coefficient of friction in the range of about 0.1 to 0.4 and a kinetic coefficients of friction in the range of about 0.1 to 0.4.

One advantage of the present packaging article is that it does not require a foil or nylon layer and therefore can be adapted for the polyester recycle stream.

Another advantage of the present development is the laminated polyester film ensures high oxygen and water vapor barrier even after retort processing, ensuring that product quality and shelf life are not compromised.

Another advantage of the present development relates to the manufacturing of gusseted pouches formed of a laminated film structure which covers and hermetically seals the space formed by panels joined together to form the gusset section of gusseted pouches.

Another advantage of the present development relates to the ability to provide a recycle-ready, retortable, polyester-based film package with gussets.

Another advantage of the present development relates to ease with which the gusseted packaging may be opened for filling and run on high-speed packaging lines.

Another advantage of the present development resides in its utility in the packaging of certain products having oily residue, such as pet food products. The presently disclosed packaging article is able to produce a good seal at thermal ultrasonic sealing step(s) of packaging process.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
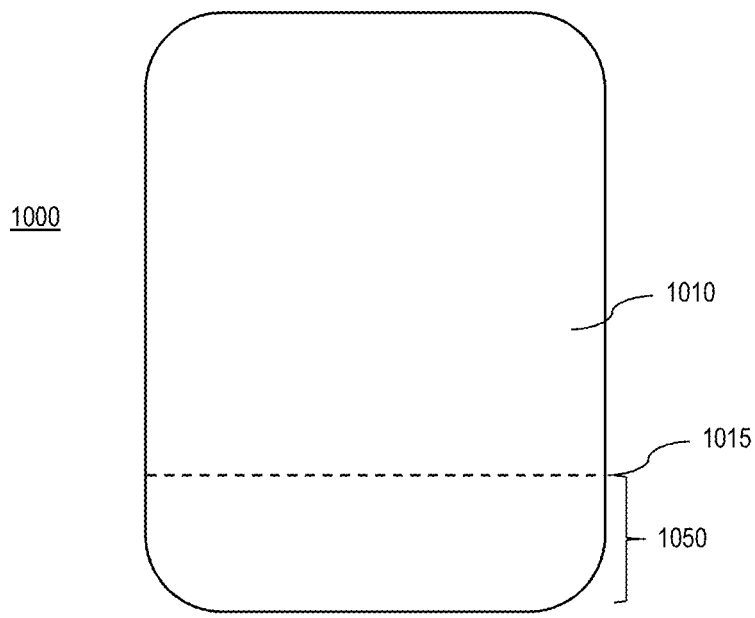
FIG. 1 is a front view of an exemplary gusseted packaging pouch formed of a laminated film structure.
Figure 2:
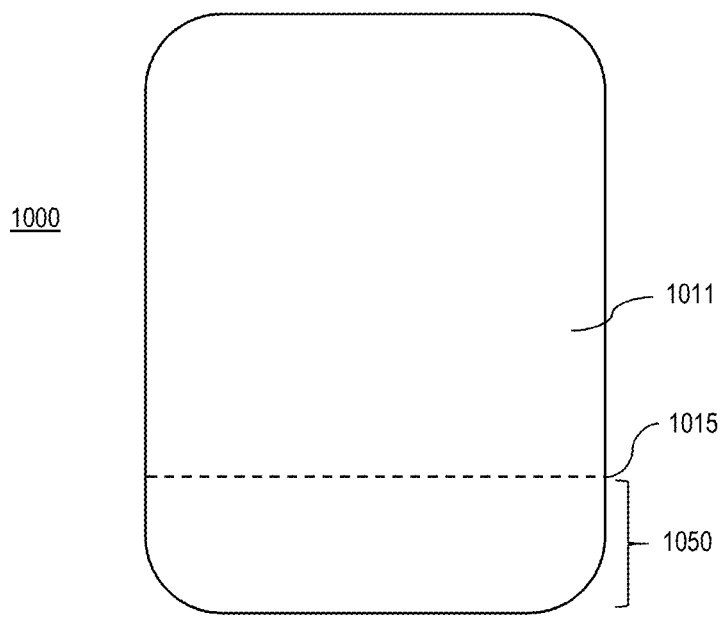
FIG. 2 is a rear view of the packaging pouch shown in FIG. 1.
Figure 3:
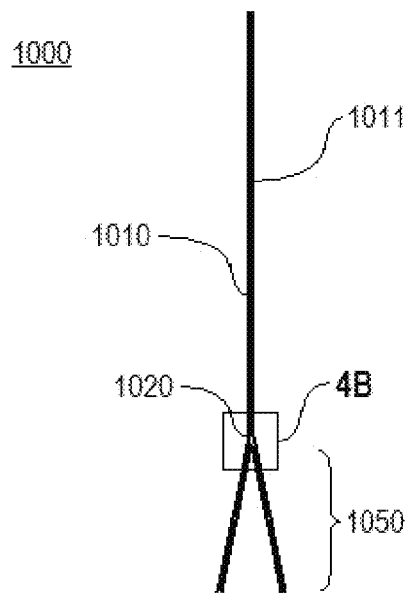
FIG. 3 is a side view of the pouch in FIG. 1 illustrating triple point area between the gusset portion and the side seal portion.

Detailed embodiments of the present development are disclosed herein; however, it is to be understood that the disclosed embodiments are merely exemplary of the invention, which may be embodied in various forms. Therefore, specific structural and functional details disclosed herein are not to be interpreted as limiting but merely as a basis for the claims and as a representative basis for teaching one skilled in the art to variously employ the present inventive concept in virtually any appropriately detailed structure. Further, the terms and phrases used herein are not intended to be limiting but rather to provide an understandable description of the present development.

The terms "a" or "an," as used herein, are defined as one or more than one. The term "another," as used herein, is defined as at least a second or more. The terms "including" and/or "having" as used herein, are defined as comprising (i.e., open transition). The term "coupled" or "operatively coupled," as used herein, is defined as indirectly or directly connected.

As used herein, the term "bending stiffness" refers to a measure of a material's resistance against bending deformation. In some embodiments, the bending stiffness of a film ply may be represented by the following formula:

$$S = EI/b$$

where "S" represents bending stiffness, "E" represents the film's elastic modulus, "I" represents the moment of inertia of a cross section, and "b" represents the width of the beam. Considering that the modulus and thickness of the adhesive is negligible compared to the modulus and thickness of the polyester film, polyester-based film structure can be considered as a monolayer. So, using the above equation and considering the moment of inertia (I) of a rectangular cross-section is represented by the formula $$I = b\left(\frac{t^3}{12}\right),$$

where b" is as defined above and "t" represents the thickness of the film, the bending stiffness S can be calculated as a function of thickness of the film:

$$S = E*t^3/12$$

Referring now to the drawings, FIGS. 1-4 illustrate an exemplary polyester-based gusseted pouch 1000, formed of one or more of the exemplary polyester-based packaging film structures and manufactured in accordance with exemplary embodiments of the present invention.

Figure 4A:
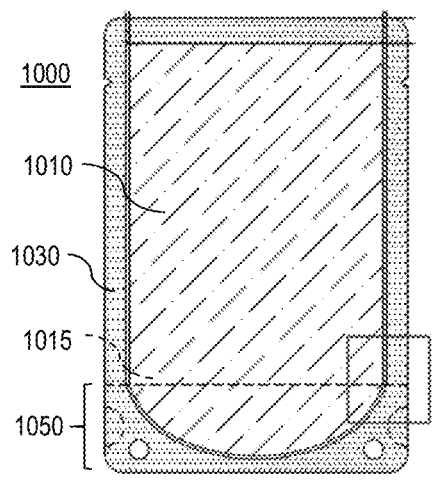
FIG. 4A is a front view of an exemplary gusseted packaging pouch formed of a laminated film structure.
Figure 4B:
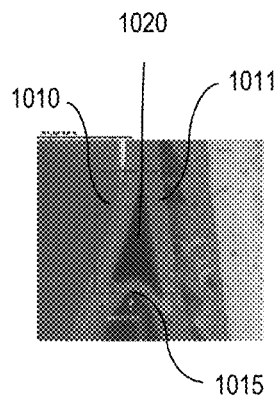
FIG. 4B is a side cross-sectional view of the triple point area between the gusset panels and the side seal portion of the packaging pouch shown in FIG. 1.
Figure 4C:
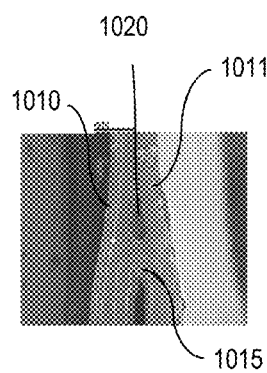
FIG. 4C is a side cross-sectional view of the triple point area between the gusset panels and the side seal portion of the packaging pouch shown in FIG. 1 with polyester-based sealant covering the trip point area.

In certain embodiments, the pouch 1000 is formed of a front portion 1010, a back portion 1011, and a gusset portion 1050 having a fold 1015. FIGS. 4A-C illustrate the space formed by the sides of the gusset portion 1050 and the side seal area 1030, which is referred to as the triple point area 1020.

Figure 5:
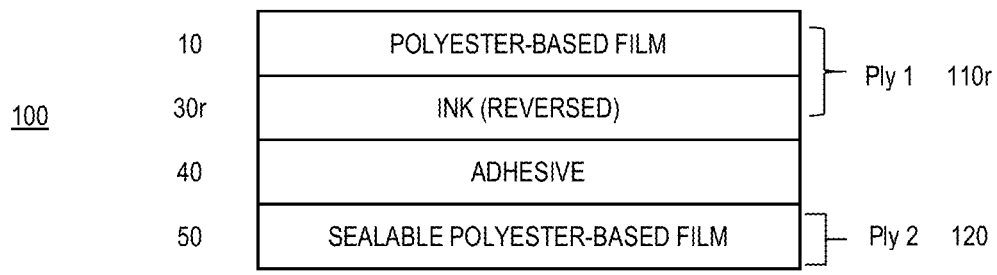
FIG. 5 is a side cross-sectional view of a first embodiment of a packaging pouch panel comprising two polyester-based film ply layers laminated together.
Figure 6:
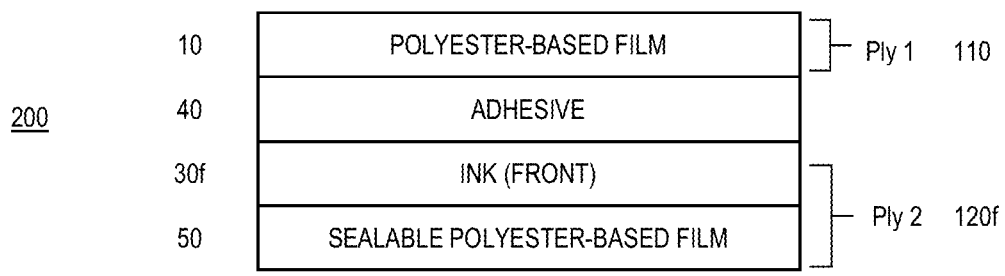
FIG. 6 is a side cross-sectional view of a second embodiment of a packaging pouch panel comprising two polyester-based film ply layers laminated together.
Figure 7:
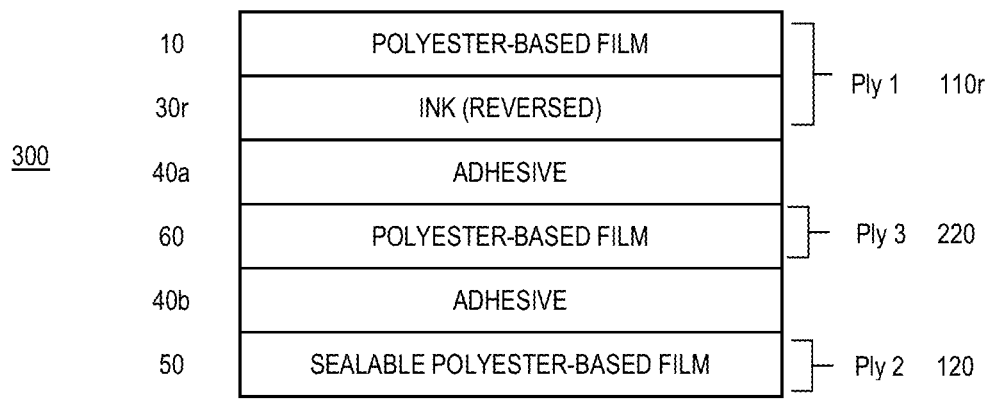
FIG. 7 is a side cross-sectional view of a third embodiment of a packaging pouch panel comprising three polyester-based film ply layers laminated together.

FIGS. 5-7 illustrate exemplary polyester based packaging film structures for forming the polyester-based gusseted packaging 1000 in accordance with exemplary embodiments of the present invention. The packaging film structures illustrated have low seal initiation temperature for forming the packaging 1000, and maintain low oxygen and water vapor transmission rates after retort processing. In certain embodiments, the laminated structure is flexible with low stiffness such that the gusset portion is able to be opened with less than or equal to 40 mBar of pressure in the package filling process. In certain preferred embodiments, the bending stiffness of the gusset film panel 1050 is less than or equal to 0.05 N/mm. The low bending stiffness of the bottom panel 1050 also aids in the formation of a hermetic seal at the triple point area 1020.

The film used for the bottom gusset panel 1050 will preferably have a two or three ply structure, e.g., as shown in FIGS. 5-7, although films with other numbers of plies, e.g., 4, 5, 6, 7, 8, or more plies, so long as the bending stiffness of the film panel 1050 is less than or equal to 0.05 N/mm. It has been found that a bottom panel with low bending stiffness contributes to the ease of gusset opening as well as achieving a hermetic seal at the triple point area. Thus, the front and rear pouch panels 1010 and 1011 may have any desired bending stiffness, so long as the bending stiffness of the gusset panel is less than or equal to 0.05 N/mm. In reducing the present invention to practice, it has been found that increasing the bending stiffness of the film used for the gusset portion to 0.07 N/mm while using the suitable sealant as discussed herein resulted in a pouch that was not hermetic and leaking at the triple point area 1020. In addition, increasing the bending stiffness of the film used for the gusset portion to 0.07 N/mm resulted in a gusset opening pressure that ranged between 20 to 80 mBar, and therefore could not consistently achieve the desired opening pressure of less than or equal to 40 mbar.

Referring now to FIG. 5, there appears a first embodiment packaging film structure 100, which includes a first ply 110r laminated to a second ply 120. In certain embodiments, the first ply 110r is an outer ply and the second ply 120 is an inner ply. An adhesive layer 40 is interposed between the first ply 110r and the second ply 120 to form a laminated structure. The adhesive layer 40 may be formed of any suitable adhesive including single component adhesives, two component adhesives, solvent-based adhesives, solventless adhesives, water-based adhesives, acrylic adhesives, electron beam lamination adhesives, and UV lamination adhesives, as would be understood by persons skilled in the art.

The first ply 110r is composed of a high-barrier polyester-based layer formed on an outer portion of the recycle-ready packaging film structure 100. The ply 110r includes a polyester-based film 10. The polyester-based film 10 is formed of a polyester-based polymeric composition. In certain embodiments, the polyester-based polymer composition comprises polybutylene terephthalate (PBT), polyethylene terephthalate (PET), or a blend of PBT and PET, wherein the ratio of PBT and PET is adjustable from 0-100% by weight of PBT in PET, depending on the packaging application.

In certain embodiments, the first ply 110r further includes a ceramic coating layer 20, formed on a first, inward facing surface of the polyester-based film 10. In certain embodiments, a second outward facing surface of the polyester-based film 10, opposite the first surface, is uncoated, and forms the outermost portion of the film structure 100. In certain embodiments, the ceramic coating 20 is formed of partially or fully oxidized aluminum or silicon or a blend of both. In certain embodiments, the ceramic coating 20 is formed of partially or fully oxidized silicon ($SiO_x$, $SiO_2$), partially or fully oxidized aluminum ($AlO_x$, $Al_2O_3$), or a mixture thereof. An additional top polymer coating layer 25 suitable for closing any cracks created during the retort process is disposed on the ceramic coating layer 20. In certain embodiments, the oxygen transmission rate (OTR) and water vapor barrier (moisture vapor transmission rate (MVTR)) of the ply 110r is less than or equal to 0.1 cc/100 in²/day (at 23 degrees C., 0% relative humidity) (and preferably 0.05 cc/100 in²/day (at 23 degrees C., 0% relative humidity)) and 0.1 g/100 in²/day (at 38 degrees C., 90% relative humidity) (and preferably 0.05 g/100 in²/day (at 38 degrees C., 90% relative humidity)), respectively, even after retort processing, ensuring that product quality and shelf life are not compromised.

Figure 12:
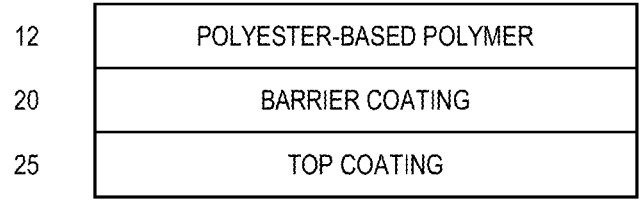
FIG. 12 illustrates an exemplary polyester-based polymer layer having a barrier coating and top coating.

A printing ink layer 30r is disposed on the polyester-based film 10. In certain embodiments, where the polyester-based film 10 is a barrier polyester-based film, such as illustrated in FIG. 12, the printing ink layer 30r is disposed on the coating layer 25 on the inward facing surface thereof, opposite the surface facing the ceramic coating layer 20. The printing ink layer 30r provides printed indicia intended to appear on a packaging article formed from the film structure 100. Because the printing ink layer 30r is applied to the inward facing surface of the polyester-based film 10, the printed material is effected in a reverse printed format. The printing ink layer 30r can be applied to the inward surface of the coating layer 25 via any conventional printing method as would be understood by persons skilled in the art, including without limitation, using a rotogravure printing apparatus or flexographic printing apparatus.

The second ply 120 includes a sealable polyester-based film 50. In certain embodiments, the sealable polyester-based film 50 is formed of a polyester-based polymer 12 and a sealable polyester layer 55, such as is described below by way of reference to FIG. 15. In certain embodiments, the sealable polyester-based film 50 includes a barrier coating 20 and a top coating 25, such as is described below by way of reference to FIG. 14. In certain embodiments, the sealable polyester-based film 50 comprises a polyester-based layer 12 and a thin, amorphous, sealable polyester layer 55. The sealable polyester-based film 50 defines a sealant layer and may comprise any polyester-based polymer suitable for providing a hermetic seal in a finished packaging article, and preferably has a low seal initiation temperature/melting point. In certain preferred embodiments, the sealable polyester layer 55 is an amorphous layer having a thickness between 2 to 25 microns. The film 50 can be clear polyester sealable film. Alternatively, the film 50 can be white (e.g., via the additional of a pigment such as titanium dioxide) to add stiffness to the structure and improve the stain resistance properties after the retort process. In certain embodiments, the second ply 120 has static and kinetic coefficients of friction in the range of from about 0.1 to 0.4. In certain embodiments, the seal initiation temperature is lower than 120° C. at 40 psi, 0.5 second dwell time. In certain embodiments, the seal initiation temperature is lower than 100° C. at 40 psi, 0.5 second dwell time. In certain embodiments, the ply 120 is selected of a material which provides a seal strength of between about 10 N/25 mm to about 100 N/25 mm, preferably about 15 N/25 mm to about 100 N/25 mm, and more preferably about 20 N/25 mm to about 100 N/25 mm, in order for a packaging article to pass the retort process. In certain embodiments, the polyester-based film structure has a maximum seal strength in the range of about 10 N/25 mm to about 100 N/25 mm, preferably in the range of about 15 N/25 mm to about 32 N/25 mm, and more preferably about 20 N/25 mm to about 30 N/25 mm. In certain embodiments, the polyester-based film structure has a minimum seal strength of greater than or equal to 10 N/25 mm, preferably greater than or equal to 15 N/25 mm, and more preferably greater than or equal to 20 N/25 mm. In certain embodiments, the minimum seal temperature to achieve the minimum seal strength is less than or equal to 115 degrees C., preferably less than or equal to 100 degrees C., more preferably less than or equal to 90 degrees C. In certain embodiments, the minimum seal temperature to achieve a seal strength of at least 10 N/25 mm is less than or equal to 115 degrees C., preferably less than or equal to 100 degrees C., more preferably less than or equal to 90 degrees C.

In certain embodiments, the first ply 110 has a thickness of 9 microns to 100 microns. In certain embodiments, the second ply 120 has a thickness of 9 microns to 100 microns. In certain preferred embodiments, the total bending stiffness of the laminated film structure of the gusseted portion of the polyester pouch is below or equal to 0.05 N/mm to allow for ease of gusset opening, for example, such that the gusset portions are able to be opened with less than or equal to 40 mBar of pressure in the package filling process.

Referring now to FIG. 6, there appears a second embodiment packaging film structure 200, comprising a first ply 110 and a second ply 120f, which are laminated together. The first ply 110 is an outer ply and the second ply 120f is an inner ply. An adhesive layer 40 is interposed between the first ply 110 and the second ply 120f to form a laminated structure. The adhesive layer 40 may be formed of an adhesive material as described above by way of reference to FIG. 5.

The first ply 110 is formed on an outer portion of the packaging film structure 200. The ply 110 includes polyester-based film 10, which may be formed of PBT, PET, or a blend of 0-100% by weight of PBT in PET, as described above by way of reference to FIG. 5.

In certain embodiments, the first ply 110 further includes a ceramic coating 20 formed on a first surface of the polyester-based film 10. The ceramic coating 20 may be formed of a material as described above by way of reference to FIG. 5. In certain preferred embodiments, the ceramic coating 20 is formed of partially or fully oxidized silicon ($SiO_x$, $SiO_2$), partially or fully oxidized aluminum ($AlO_x$, $Al_2O_3$), or a mixture thereof. An additional polymer coating layer 25 suitable for closing any cracks created during the retort process is disposed on the ceramic coating layer 20.

The second ply 120f includes a sealable polyester-based film 50. In certain embodiments, the sealable polyester-based film 50 is formed of a polyester-based polymer 12 and a sealable polyester layer 55, such as is described below by way of reference to FIG. 15. In certain embodiments, the sealable polyester film 50 includes a barrier coating 20 and a top coating 25, such as is described below by way of reference to FIG. 14. In certain embodiments, the sealable polyester-based film 50 comprises a polyester-based layer 12 and a thin, amorphous, sealable polyester layer 55. The sealable polyester-based film 50 defines a sealant layer and may comprise any polyester-based polymer suitable for providing a hermetic seal in a finished packaging article, and preferably has a low seal initiation temperature/melting point. In certain preferred embodiments, the sealable polyester layer 55 is an amorphous layer having a thickness between 2 to 25 microns. The film 50 can be clear polyester sealable film. Alternatively, the film 50 can be white (e.g., via the additional of a pigment such as titanium dioxide) to add stiffness to the structure and improve the stain resistance properties after the retort process. In certain embodiments, the second ply 120f has static and kinetic coefficients of friction in the range of from about 0.1 to 0.4. In certain embodiments, the seal initiation temperature is lower than 120° C. at 40 psi, 0.5 second dwell time. In still further embodiments, the seal initiation temperature is lower than 100° C. at 40 psi, 0.5 second dwell time. In certain embodiments, the ply 120f is selected of a material which provides a seal strength of between about 10 N/25 mm to about 100 N/25 mm, preferably about 15 N/25 mm to about 100 N/25 mm, and more preferably about 20 N/25 mm to about 100

N/25 mm, in order for a packaging article to pass the retort process. In certain embodiments, the polyester-based film structure has a maximum seal strength in the range of about 10 N/25 mm to about 100 N/25 mm, preferably in the range of about 15 N/25 mm to about 32 N/25 mm, and more preferably about 20 N/25 mm to about 30 N/25 mm. In certain embodiments, the polyester-based film structure has a minimum seal strength of greater than or equal to 10 N/25 mm, preferably greater than or equal to 15 N/25 mm, and more preferably greater than or equal to 20 N/25 mm. In certain embodiments, the minimum seal temperature to achieve the minimum seal strength is less than or equal to 115 degrees C., preferably less than or equal to 100 degrees C., more preferably less than or equal to 90 degrees C. In certain embodiments, the minimum seal temperature to achieve a seal strength of at least 10 N/25 mm is less than or equal to 115 degrees C., preferably less than or equal to 100 degrees C., more preferably less than or equal to 90 degrees C.

A printing ink layer 30f is disposed on an outward facing surface of the sealable polyester-based film 50. The printing ink layer 30f provides printed indicia intended to appear on a packaging article formed from the film structure 200. Because the printing ink layer 30f is applied to the outward facing surface of the sealable polyester-based film 50, the printed material is effected in a front printed format. The printing ink layer 30f can be applied to the outward facing surface of the polyester-based film via any conventional printing method as would be understood by persons skilled in the art, including without limitation, using a rotogravure printing apparatus or flexographic printing apparatus.

In certain embodiments, the first ply 110 has a thickness of 9 microns to 100 microns. In certain embodiments, the second ply 120f has a thickness of 9 microns to 100 microns. In certain preferred embodiments, the bending stiffness of the laminated film structure of the gusseted portion of the pouch is below or equal to 0.05 N/mm to allow for ease of gusset opening, for example, such that the gusset portions are able to be opened with less than or equal to 40 mBar of pressure in the package filling process. The low bending stiffness also aids in the formation of a hermetic seal.

Referring now to FIG. 7, there appears a third embodiment packaging film structure 300, comprising a first ply 110r, a third ply 220, and a second ply, 120, which are laminated together. The first ply 110r is an outer ply, the second ply 120 is an inner ply, and the third ply 220 is an intermediate ply interposed between the first and second ply layers. A first adhesive layer 40a is interposed between the first ply 110r and the third ply 220 and a second adhesive layer 40b is interposed between the third ply 220 and the second ply 120, to form a laminated structure. The adhesive layers 40a and 40b may be formed of an adhesive material as described above by way of reference to FIG. 5.

The first ply 110r is formed on an outer portion of the packaging film structure 300. The ply 110r includes polyester-based film 10, which may be formed of PBT, PET, or a blend of 0-100% by weight of PBT in PET, as described above by way of reference to FIG. 5.

In certain embodiments, the first ply 110r further includes a ceramic coating 20 formed on a first surface of the polyester-based film 10. The ceramic coating 20 may be formed of a material as described above by way of reference to FIG. 5. In certain preferred embodiments, the ceramic coating 20 is formed of partially or fully oxidized silicon ($SiO_x$, $SiO_2$), partially or fully oxidized aluminum ($AlO_x$, $Al_2O_3$), or a mixture thereof. An additional polymer coating layer 25 suitable for closing any cracks created during the retort process is disposed on the ceramic coating layer 20.

A printing ink layer 30r is disposed on the inward facing surface of polyester-based film 10. In certain embodiments where the polyester-based film 10 is a barrier polyester-based film, the printing ink layer 30r is disposed on the coating layer 25 on the surface opposite the surface facing the ceramic coating layer 20. The printing ink layer 30r provides printed indicia intended to appear on a packaging article formed from the film structure 300. Because the printing ink layer 30r is applied to the inward facing surface of the polyester-based film 10, the printed material is effected in a reverse printed format. The printing ink layer 30r can be applied to the inward surface of the coating layer 25 via any conventional printing method as would be understood by persons skilled in the art, including without limitation, using a rotogravure printing apparatus or flexographic printing apparatus.

The second ply 120 includes a sealable polyester-based film 50. In certain embodiments, the sealable polyester-based film 50 is formed of a polyester polymer 12 and a sealable polyester layer 55, such as is described below by way of reference to FIG. 15. In certain embodiments, the sealable polyester film 50 includes a barrier coating 20 and a top coating 25, such as is described below by way of reference to FIG. 14. In certain embodiments, the sealable polyester-based film 50 comprises a polyester-based layer 12 and a thin, amorphous, sealable polyester layer 55. The sealable polyester-based film 50 defines a sealant layer and may comprise any polyester-based polymer suitable for providing a hermetic seal in a finished packaging article, and preferably has a low seal initiation temperature/melting point. In certain preferred embodiments, the sealable polyester layer 55 is an amorphous layer having a thickness between 2 to 25 microns. The film 50 can be clear polyester sealable film. Alternatively, the film 50 can be white (e.g., via the additional of a pigment such as titanium dioxide) to add stiffness to the structure and improve the stain resistance properties after the retort process. In certain embodiments, the second ply 120 has static and kinetic coefficients of friction in the range of from about 0.1 to 0.4. In certain embodiments, the seal initiation temperature is lower than 120° C. at 40 psi, 0.5 second dwell time. In certain embodiments, the seal initiation temperature is lower than 100° C. at 40 psi, 0.5 second dwell time. In certain embodiments, the ply 120 is selected of a material which provides a seal strength of between about 10 N/25 mm to about 100 N/25 mm, preferably about 15 N/25 mm to about 100 N/25 mm, and more preferably about 20 N/25 mm to about 100 N/25 mm, in order for a packaging article to pass the retort process. In certain embodiments, the polyester-based film structure has a maximum seal strength in the range of about 10 N/25 mm to about 100 N/25 mm, preferably in the range of about 15 N/25 mm to about 32 N/25 mm, and more preferably about 20 N/25 mm to about 30 N/25 mm. In certain embodiments, the polyester-based film structure has a minimum seal strength of greater than or equal to 10 N/25 mm, preferably greater than or equal to 15 N/25 mm, and more preferably greater than or equal to 20 N/25 mm. In certain embodiments, the minimum seal temperature to achieve the minimum seal strength is less than or equal to 115 degrees C., preferably less than or equal to 100 degrees C., more preferably less than or equal to 90 degrees C. In certain embodiments, the minimum seal temperature to achieve a seal strength of at least 10 N/25 mm is less than or equal to 115 degrees C., preferably less than or equal to 100 degrees C., more preferably less than or equal to 90 degrees C.

The third ply 220 is interposed between the first ply 110 and the second ply 120. The third ply includes a polyester-based film 60, which is formed of a polyester-based polymeric composition. In certain embodiments, the polyester-based polymer composition comprises PBT, PET, or a blend of 0-100% by weight of PBT in PET, the ratio of which is adjustable depending on the packaging application. The film 60 can be clear polyester-based film. Alternatively, the film 60 can be white (e.g., via the additional of a pigment such as titanium dioxide) to add stiffness to the structure and improve the stain resistance properties after the retort process. In certain embodiments, the third ply 220 further includes a ceramic coating 20 formed on a first surface of the polyester-based film 60. The ceramic coating 20 may be formed of a material as described above by way of reference to FIG. 5. In certain preferred embodiments, is formed of partially or fully oxidized silicon ($SiO_x$, $SiO_2$), partially or fully oxidized aluminum ($AlO_x$, $Al_2O_3$), or a mixture thereof. An additional polymer coating layer 25 suitable for closing any cracks created during the retort process is disposed on the ceramic coating layer 20.

In certain embodiments, the first ply 110r has a thickness of 9 microns to 100 microns. In certain embodiments, the second ply 120 has a thickness of 9 microns to 100 microns. In certain embodiments, the third ply 220 has a thickness of 9 microns to 100 microns. In certain preferred embodiments, the gusseted portion of a polyester-based pouch is formed of a laminated film structure comprising the first ply 110r and the second ply 120, where the total bending stiffness of the laminated film structure of the gusseted portion is below or equal to 0.05 N/mm, and the front and back panels of the gusseted pouch are formed of a laminated film structure comprising the first ply 110, the third ply 220, and the second ply 120.

Figure 8:
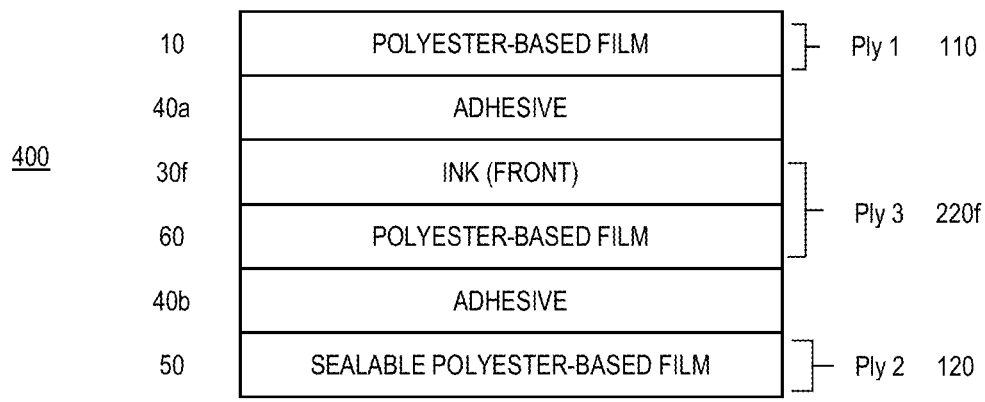
FIG. 8 is a side cross-sectional view of a fourth embodiment of a packaging pouch panel comprising three polyester-based film ply layers laminated together.

Referring now to FIG. 8, there appears a fourth embodiment packaging film structure 400, comprising a first ply 110, a third ply 220f, and a second ply, 120, which are laminated together. The first ply 110 is an outer ply, the second ply 120 is an inner ply, and the third ply 220f is an intermediate ply interposed between the first and second ply layers. A first adhesive layer 40a is interposed between the first ply 110 and the third ply 220f and a second adhesive layer 40b is interposed between the third ply 220f and the second ply 120f, to form a laminated structure. The adhesive layers 40a and 40b may be formed of an adhesive material as described above by way of reference to FIG. 5.

The first ply 110 is formed on an outer portion of the packaging film structure 400. The ply 110 includes polyester-based film 10, which may be formed of PBT, PET, or a blend of 0-100% by weight of PBT in PET, as described above by way of reference to FIG. 5.

In certain embodiments, the first ply 110 further includes a ceramic coating 20 formed on a first surface of the polyester-based ply 10. The ceramic coating 20 may be formed of a material as described above by way of reference to FIG. 5. In certain preferred embodiments, the ceramic coating is formed of partially or fully oxidized silicon ($SiO_x$, $SiO_2$), partially or fully oxidized aluminum ($AlO_x$, $Al_2O_3$), or a mixture thereof. An additional polymer coating layer 25 suitable for closing any cracks created during the retort process is disposed on the ceramic coating layer 20.

The second ply 120 includes a sealable polyester-based film 50. In certain embodiments, the sealable polyester-based film 50 is formed of a polyester polymer 12 and a sealable polyester layer 55, such as is described below by way of reference to FIG. 15. In certain embodiments, the sealable polyester film 50 includes a barrier coating 20 and a top coating 25, such as is described below by way of reference to FIG. 14. In certain embodiments, the sealable polyester-based film 50 comprises a polyester-based layer 12 and a thin, amorphous, sealable polyester layer 55. The sealable polyester-based film 50 defines a sealant layer and may comprise any polyester-based polymer suitable for providing a hermetic seal in a finished packaging article, and preferably has a low seal initiation temperature/melting point. In certain preferred embodiments, the sealable polyester layer 55 is an amorphous layer having a thickness between 2 to 25 microns. The film 50 can be clear polyester sealable film. Alternatively, the film 50 can be white (e.g., via the additional of a pigment such as titanium dioxide) to add stiffness to the structure and improve the stain resistance properties after the retort process. In certain embodiments, the second ply 120 has static and kinetic coefficients of friction in the range of from about 0.1 to 0.4. In certain embodiments, the seal initiation temperature is lower than 120° C. at 40 psi, 0.5 second dwell time. In certain embodiments, the seal initiation temperature is lower than 100° C. at 40 psi, 0.5 second dwell time. In certain embodiments, the ply 120 is selected of a material which provides a seal strength of between about 10 N/25 mm to about 100 N/25 mm, preferably about 15 N/25 mm to about 100 N/25 mm, and more preferably about 20 N/25 mm to about 100 N/25 mm, in order for a packaging article to pass the retort process. In certain embodiments, the polyester-based film structure has a maximum seal strength in the range of about 10 N/25 mm to about 100 N/25 mm, preferably in the range of about 15 N/25 mm to about 32 N/25 mm, and more preferably about 20 N/25 mm to about 30 N/25 mm. In certain embodiments, the polyester-based film structure has a minimum seal strength of greater than or equal to 10 N/25 mm, preferably greater than or equal to 15 N/25 mm, and more preferably greater than or equal to 20 N/25 mm. In certain embodiments, the minimum seal temperature to achieve the minimum seal strength is less than or equal to 115 degrees C., preferably less than or equal to 100 degrees C., more preferably less than or equal to 90 degrees C. In certain embodiments, the minimum seal temperature to achieve a seal strength of at least 10 N/25 mm is less than or equal to 115 degrees C., preferably less than or equal to 100 degrees C., more preferably less than or equal to 90 degrees C.

The third ply 220f is interposed between the first ply 110 and the second ply 120. The third ply includes a polyester-based film 60, which is formed of a polyester-based polymeric composition. In certain embodiments, the polyester-based polymer composition comprises PBT, PET, or a blend of 0-100% by weight of PBT in PET, the ratio of which is adjustable depending on the packaging application. The film 60 can be clear polyester-based film. Alternatively, the film 60 can be white (e.g., via the additional of a pigment such as titanium dioxide) to add stiffness to the structure and improve the stain resistance properties after the retort process. In certain embodiments, the third ply 220f further includes a ceramic coating 20 formed on a first surface of the polyester-based film 60. The ceramic coating 20 may be formed of a material as described above by way of reference to FIG. 5. In certain preferred embodiments, is formed of partially or fully oxidized silicon ($SiO_x$, $SiO_2$), partially or fully oxidized aluminum ($AlO_x$, $Al_2O_3$), or a mixture thereof. An additional polymer coating layer 25 suitable for closing any cracks created during the retort process is disposed on the ceramic coating layer 20.

A printing ink layer 30f is disposed on an outward facing surface of the polyester-based film 60. The printing ink layer 30f provides printed indicia intended to appear on a packaging article formed from the film structure 400. Because the printing ink layer 30f is applied to the outward facing surface of the polyester-based film 60, the printed material is effected in a front printed format. The printing ink layer 30f can be applied to the outward facing surface of the polyester-based film via any conventional printing method as would be understood by persons skilled in the art, including without limitation, using a rotogravure printing apparatus or flexographic printing apparatus.

In certain embodiments, the first ply 110 has a thickness of 9 microns to 100 microns. In certain embodiments, the second ply 120 has a thickness of 9 microns to 100 microns. In certain embodiments, the third ply 220f has a thickness of 9 microns to 100 microns. In certain preferred embodiments, the gusseted portion of a polyester-based pouch is formed of a laminated film structure comprising the first ply 110 and the second ply 120, where the total bending stiffness of the laminated film structure of the gusseted portion is below or equal to 0.05 N/mm, and the front and back panels of the gusseted pouch are formed of a laminated film structure comprising the first ply 110, the third ply 220f, and the second ply 120.

Figure 9:
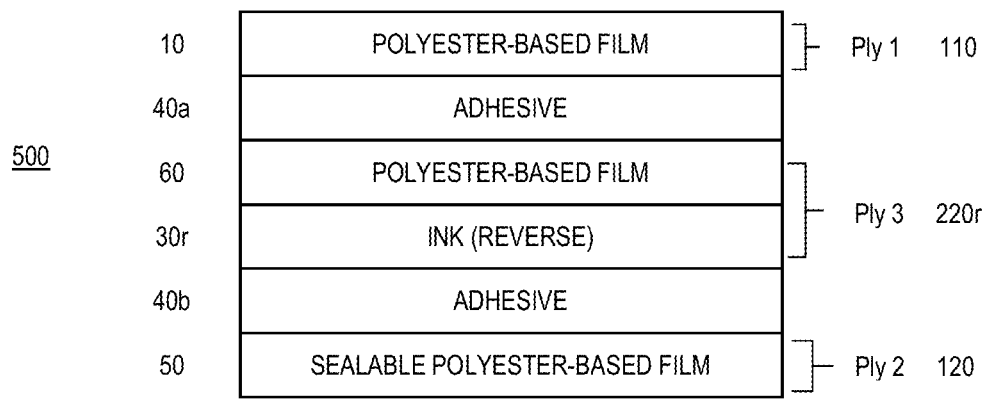
FIG. 9 is a side cross-sectional view of a fifth embodiment of a packaging pouch panel comprising three polyester-based film ply layers laminated together.

Referring now to FIG. 9, there appears a fifth embodiment packaging film structure 500, comprising a first ply 110, a third ply 220r, and a second ply, 120, which are laminated together. The first ply 110 is an outer ply, the second ply 120 is an inner ply, and the third ply 220r is an intermediate ply interposed between the first and second ply layers. A first adhesive layer 40a is interposed between the first ply 110 and the third ply 220r and a second adhesive layer 40b is interposed between the third ply 220r and the second ply 120, to form a laminated structure. The adhesive layers 40a and 40b may be formed of an adhesive material as described above by way of reference to FIG. 5.

The first ply 110 is formed on an outer portion of the packaging film structure 500. The ply 110 includes polyester-based film 10, which may be formed of PBT, PET, or a blend of 0-100% by weight of PBT in PET, as described above by way of reference to FIG. 5.

In certain embodiments, the first ply 110 further includes a ceramic coating 20 formed on a first surface of the polyester-based film 10. The ceramic coating 20 may be formed of a material as described above by way of reference to FIG. 5. In certain preferred embodiments, the ceramic coating is formed of partially or fully oxidized silicon ($SiO_x$, $SiO_2$), partially or fully oxidized aluminum ($AlO_x$, $Al_2O_3$), or a mixture thereof. An additional polymer coating layer 25 suitable for closing any cracks created during the retort process is disposed on the ceramic coating layer 20.

The second ply 120 includes a sealable polyester-based film 50. In certain embodiments, the sealable polyester-based film 50 is formed of a polyester polymer 12 and a sealable polyester layer 55, such as is described below by way of reference to FIG. 15. In certain embodiments, the sealable polyester film 50 includes a barrier coating 20 and a top coating 25, such as is described below by way of reference to FIG. 14. In certain embodiments, the sealable polyester-based film 50 comprises a polyester-based layer 12 and a thin, amorphous, sealable polyester layer 55. The sealable polyester-based film 50 defines a sealant layer and may comprise any polyester-based polymer suitable for providing a hermetic seal in a finished packaging article, and preferably has a low seal initiation temperature/melting point. In certain preferred embodiments, the sealable polyester layer 55 is an amorphous layer having a thickness between 2 to 25 microns. The film 50 can be clear polyester sealable film. Alternatively, the film 50 can be white (e.g., via the additional of a pigment such as titanium dioxide) to add stiffness to the structure and improve the stain resistance properties after the retort process. In certain embodiments, the second ply 120 has static and kinetic coefficients of friction in the range of from about 0.1 to 0.4. In certain embodiments, the seal initiation temperature is lower than 120° C. at 40 psi, 0.5 second dwell time. In certain embodiments, the seal initiation temperature is lower than 100° C. at 40 psi, 0.5 second dwell time. In certain embodiments, the ply 120 is selected of a material which provides a seal strength of between about 10 N/25 mm to about 100 N/25 mm, preferably about 15 N/25 mm to about 100 N/25 mm, and more preferably about 20 N/25 mm to about 100 N/25 mm, in order for a packaging article to pass the retort process. In certain embodiments, the polyester-based film structure has a maximum seal strength in the range of about 10 N/25 mm to about 100 N/25 mm, preferably in the range of about 15 N/25 mm to about 32 N/25 mm, and more preferably about 20 N/25 mm to about 30 N/25 mm. In certain embodiments, the polyester-based film structure has a minimum seal strength of greater than or equal to 10 N/25 mm, preferably greater than or equal to 15 N/25 mm, and more preferably greater than or equal to 20 N/25 mm. In certain embodiments, the minimum seal temperature to achieve the minimum seal strength is less than or equal to 115 degrees C., preferably less than or equal to 100 degrees C., more preferably less than or equal to 90 degrees C. In certain embodiments, the minimum seal temperature to achieve a seal strength of at least 10 N/25 mm is less than or equal to 115 degrees C., preferably less than or equal to 100 degrees C., more preferably less than or equal to 90 degrees C.

The third ply 220r is interposed between the first ply 110 and the second ply 120. The third ply includes a polyester-based film 60, which is formed of a polyester-based polymeric composition. In certain embodiments, the polyester-based polymer composition comprises PBT, PET, or a blend of 0-100% by weight of PBT in PET, the ratio of which is adjustable depending on the packaging application. The film 60 can be clear polyester-based film. Alternatively, the film 60 can be white (e.g., via the additional of a pigment such as titanium dioxide) to add stiffness to the structure and improve the stain resistance properties after the retort process. In certain embodiments, the third ply 220 further includes a ceramic coating 20 formed on a first surface of the polyester-based film 60. The ceramic coating 20 may be formed of a material as described above by way of reference to FIG. 5. In certain preferred embodiments, is formed of partially or fully oxidized silicon (SiOx, SiO2), partially or fully oxidized aluminum (AlOx, Al2O3), or a mixture thereof. An additional polymer coating layer 25 suitable for closing any cracks created during the retort process is disposed on the ceramic coating layer 20.

A printing ink layer 30r is disposed on the inward facing surface of polyester-based film 60. In certain embodiments where the polyester-based film 60 is a barrier polyester-based film, the printing ink layer 30r is disposed on the coating layer 25 on the surface opposite the surface facing the ceramic coating layer 20. The printing ink layer 30r provides printed indicia intended to appear on a packaging article formed from the film structure 500. Because the printing ink layer 30r is applied to the inward facing surface of the polyester-based film 60, the printed material is effected in a reverse printed format. The printing ink layer 30r can be applied to the inward surface of the coating layer 25 via any conventional printing method as would be understood by persons skilled in the art, including without limitation, using a rotogravure printing apparatus or flexographic printing apparatus.

In certain embodiments, the first ply 110 has a thickness of 9 microns to 100 microns. In certain embodiments, the second ply 120 has a thickness of 9 microns to 100 microns. In certain embodiments, the third ply 220r has a thickness of 9 microns to 100 microns. In certain preferred embodiments, the gusseted portion of a polyester-based pouch is formed of a laminated film structure comprising the first ply 110 and the second ply 120, where the total bending stiffness of the laminated film structure of the gusseted portion is below or equal to 0.05 N/mm, and the front and back panels of the gusseted pouch are formed of a laminated film structure comprising the first ply 110, the third ply 220r, and the second ply 120.

Figure 10:
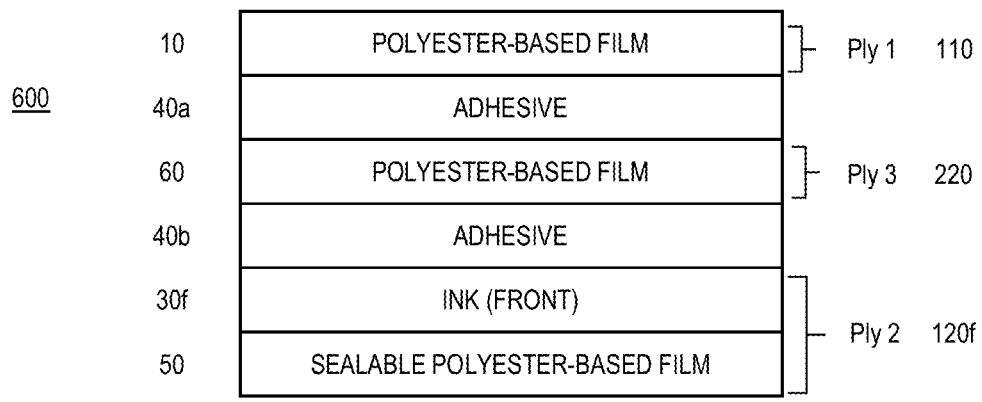
FIG. 10 is a side cross-sectional view of a sixth embodiment of a packaging pouch panel comprising three polyester-based film ply layers laminated together.

Referring now to FIG. 10, there appears a sixth embodiment packaging film structure 600, comprising a first ply 110, a third ply 220, and a second ply, 120f, which are laminated together. The first ply 110 is an outer ply, the second ply 120f is an inner ply, and the third ply 220 is an intermediate ply interposed between the first and second ply layers. A first adhesive layer 40a is interposed between the first ply 110 and the third ply 220 and a second adhesive layer 40b is interposed between the third ply 220 and the second ply 120f, to form a laminated structure. The adhesive layers 40a and 40b may be formed of an adhesive material as described above by way of reference to FIG. 5.

The first ply 110 is formed on an outer portion of the packaging film structure 600. The ply 110 includes polyester-based film 10, which may be formed of PBT, PET, or a blend of 0-100% by weight of PBT in PET, as described above by way of reference to FIG. 5.

In certain embodiments, the first ply 110 further includes a ceramic coating 20 formed on a first surface of the polyester-based film 10. The ceramic coating 20 may be formed of a material as described above by way of reference to FIG. 5. In certain preferred embodiments, the ceramic coating is formed of partially or fully oxidized silicon ($SiO_x$, $SiO_2$), partially or fully oxidized aluminum ($AlO_x$, $Al_2O_3$), or a mixture thereof. An additional polymer coating layer 25 suitable for closing any cracks created during the retort process is disposed on the ceramic coating layer 20.

The second ply 120f includes a sealable polyester-based film 50. In certain embodiments, the sealable polyester-based film 50 is formed of a polyester polymer 12 and a sealable polyester layer 55, such as is described below by way of reference to FIG. 15. In certain embodiments, the sealable polyester film 50 includes a barrier coating 20 and a top coating 25, such as is described below by way of reference to FIG. 14. In certain embodiments, the sealable polyester-based film 50 comprises a polyester-based layer 12 and a thin, amorphous, sealable polyester layer 55. The sealable polyester-based film 50 defines a sealant layer and may comprise any polyester-based polymer suitable for providing a hermetic seal in a finished packaging article, and preferably has a low seal initiation temperature/melting point. In certain preferred embodiments, the sealable polyester layer 55 is an amorphous layer having a thickness between 2 to 25 microns. The film 50 can be clear polyester sealable film. Alternatively, the film 50 can be white (e.g., via the additional of a pigment such as titanium dioxide) to add stiffness to the structure and improve the stain resistance properties after the retort process. In certain embodiments, the second ply 120 has static and kinetic coefficients of friction in the range of from about 0.1 to 0.4. In certain embodiments, the seal initiation temperature is lower than 120° C. at 40 psi, 0.5 second dwell time. In certain embodiments, the seal initiation temperature is lower than 100° C. at 40 psi, 0.5 second dwell time. In certain embodiments, the ply 120f is selected of a material which provides a seal strength of between about 10 N/25 mm to about 100 N/25 mm, preferably about 15 N/25 mm to about 100 N/25 mm, and more preferably about 20 N/25 mm to about 100 N/25 mm, in order for a packaging article to pass the retort process. In certain embodiments, the polyester-based film structure has a maximum seal strength in the range of about 10 N/25 mm to about 100 N/25 mm, preferably in the range of about 15 N/25 mm to about 32 N/25 mm, and more preferably about 20 N/25 mm to about 30 N/25 mm. In certain embodiments, the polyester-based film structure has a minimum seal strength of greater than or equal to 10 N/25 mm, preferably greater than or equal to 15 N/25 mm, and more preferably greater than or equal to 20 N/25 mm. In certain embodiments, the minimum seal temperature to achieve the minimum seal strength is less than or equal to 115 degrees C., preferably less than or equal to 100 degrees C., more preferably less than or equal to 90 degrees C. In certain embodiments, the minimum seal temperature to achieve a seal strength of at least 10 N/25 mm is less than or equal to 115 degrees C., preferably less than or equal to 100 degrees C., more preferably less than or equal to 90 degrees C.

A printing ink layer 30f is disposed on an outward facing surface of the sealable polyester-based film 50. The printing ink layer 30f provides printed indicia intended to appear on a packaging article formed from the film structure 600. Because the printing ink layer 30f is applied to the outward facing surface of the sealable polyester-based film 50, the printed material is effected in a front printed format. The printing ink layer 30f can be applied to the outward facing surface of the sealable polyester-based film via any conventional printing method as would be understood by persons skilled in the art, including without limitation, using a rotogravure printing apparatus or flexographic printing apparatus.

The third ply 220 is interposed between the first ply 110 and the second ply 120f. The third ply includes a polyester-based film 60, which is formed of a polyester-based polymeric composition. In certain embodiments, the polyester-based polymer composition comprises PBT, PET, or a blend of 0-100% by weight of PBT in PET, the ratio of which is adjustable depending on the packaging application. The film 60 can be clear polyester-based film. Alternatively, the film 60 can be white (e.g., via the additional of a pigment such as titanium dioxide) to add stiffness to the structure and improve the stain resistance properties after the retort process. In certain embodiments, the third ply 220 further includes a ceramic coating 20 formed on a first surface of the polyester-based film 60. The ceramic coating 20 may be formed of a material as described above by way of reference to FIG. 5. In certain preferred embodiments, is formed of partially or fully oxidized silicon (SiOx, SiO2), partially or fully oxidized aluminum (AlOx, Al2O3), or a mixture thereof. An additional polymer coating layer 25 suitable for closing any cracks created during the retort process is disposed on the ceramic coating layer 20.

In certain embodiments, the first ply 110 has a thickness of 9 microns to 100 microns. In certain embodiments, the second ply 120f has a thickness of 9 microns to 100 microns.

In certain embodiments, the third ply 220 has a thickness of 9 microns to 100 microns. In certain preferred embodiments, the gusseted portion of a polyester-based pouch is formed of a laminated film structure comprising the first ply 110 and the second ply 120f, where the total bending stiffness of the laminated film structure of the gusseted portion is below or equal to 0.05 N/mm, and the front and back panels of the gusseted pouch are formed of a laminated film structure comprising the first ply 110, the third ply 220, and the second ply 120f.

Figure 11:
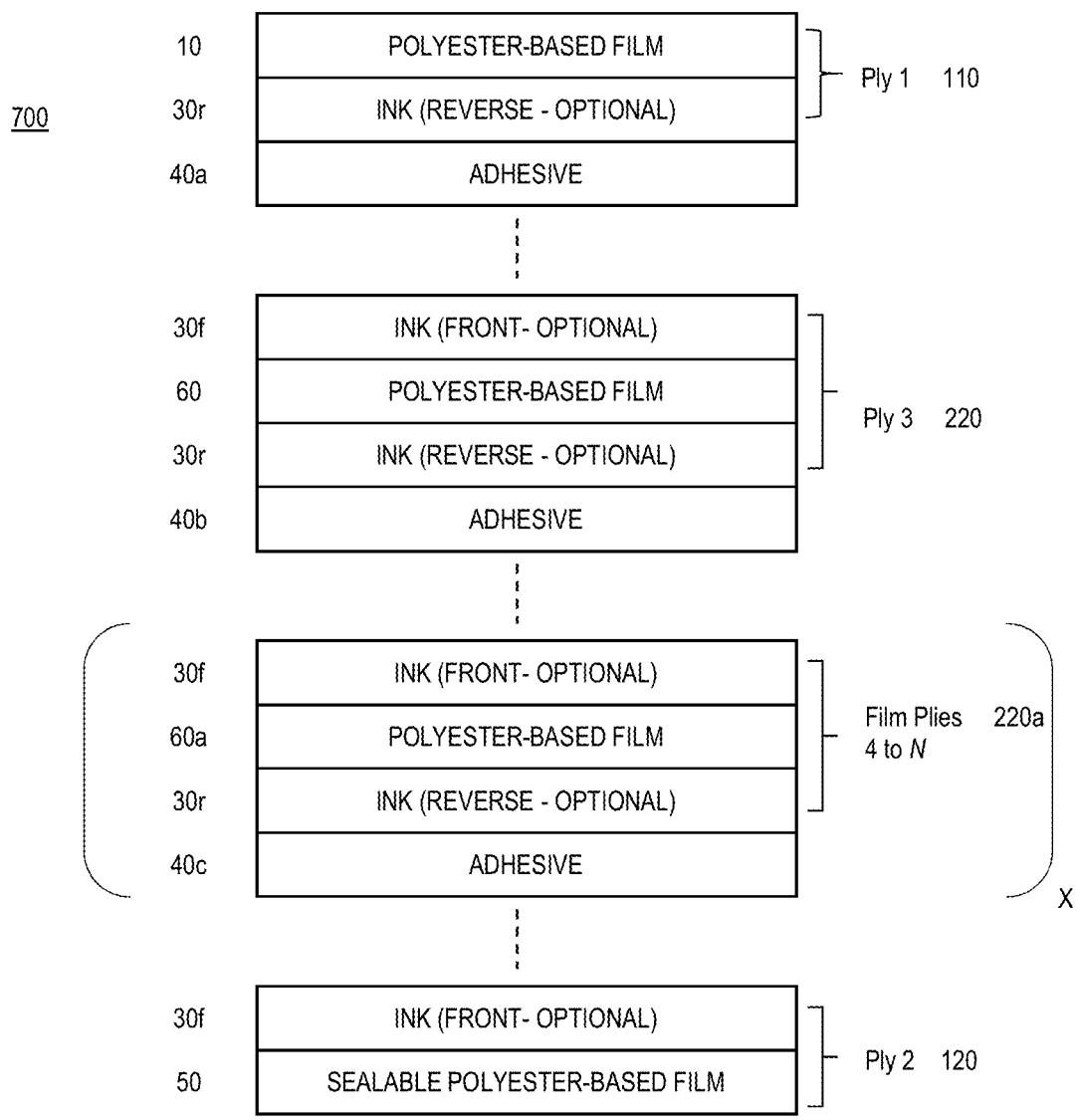
FIG. 11 is a side cross-sectional view of a seventh embodiment of a packaging pouch panel comprising four or more polyester-based film ply layers laminated together.

Referring now to FIG. 11, there appears a seventh embodiment packaging film structure 700, comprising a first ply 110, a third ply 220, a second ply 120, and one or more (up to "X") plies, designated 220a, where X is 1, 2, 3, 4, 5, 6, 7, 8, 9, or more, and N is 4, 5, 6, 7, 8, 9, 10, 11, 12, or more, which are laminated together. The first ply 110 is an outer ply, the second ply 120 is an inner ply, and the third ply 220 is an intermediate ply. A first adhesive layer 40a is interposed between the first ply 110 and the third ply 220 and a second adhesive layer 40b is interposed between the third ply 220 and the fourth ply 220a, and further adhesive layers 40c are disposed between the fourth and subsequent plies 220a and the second ply 120f to form a laminated structure. The adhesive layers 40a, 40b, and 40c may be formed of an adhesive material as described above by way of reference to FIG. 5.

Figure 13:
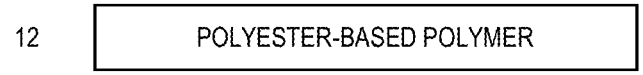
FIG. 13 illustrates an exemplary polyester-based polymer layer.

FIGS. 12 and 13 illustrate exemplary polyester-based films. FIG. 12 illustrates a three-layer barrier-coated polyester-based film, which is operable to embody the polyester-based film layers 10 and 60. The three-layer barrier-coated polyester-based film comprises a polyester-based polymer layer 12, a barrier coating layer 20, and a polymer top coating layer 25. In certain embodiments, the composition of the polyester-based polymer 12 comprises PBT, PET, or a blend of 0-100% by weight of PBT in PET, the ratio of which is adjustable depending on the packaging application. In certain embodiments, the barrier coating layer 20 is a ceramic coating formed of partially or fully oxidized aluminum or silicon or a blend of both. In certain preferred embodiments, the ceramic coating is formed of partially or fully oxidized silicon ($SiO_x$, $SiO_2$), partially or fully oxidized aluminum ($AlO_x$, $Al_2O_3$), or a mixture thereof. FIG. 13 illustrates a polyester-based film structure comprising a polyester polymer layer 12, which is operable to embody the polyester-based films 10 and 60. In certain embodiments, the composition of the polyester-based polymer 12 comprises PBT, PET, or a blend of 0-100% by weight of PBT in PET, the ratio of which is adjustable depending on the packaging application. The film 60 can be clear polyester-based film. Alternatively, the film 60 can be white (e.g., via the additional of a pigment such as titanium dioxide) to add stiffness to the structure and improve the stain resistance properties after the retort process.

Figure 14:
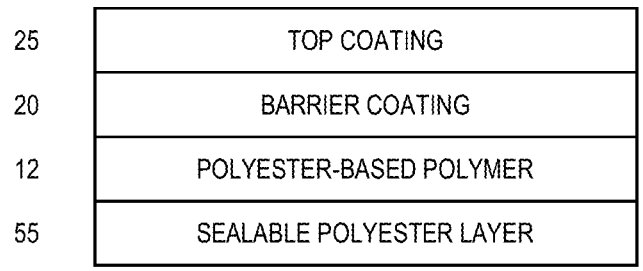
FIG. 14 illustrates an exemplary sealable polyester-based film having a barrier coating and a top coating.

FIG. 14 illustrates an exemplary sealable polyester-based film, which is operable to embody the sealable polyester-based film 50. The sealable polyester-based film 50 may comprise a polyester-based polymer 12 (such as described by way of reference above to FIG. 12 or 13) further having a barrier layer 20 on a first surface of the polyester-based polymer 12, and a sealable polyester layer 55 on a second surface of the polyester-based polymer 12. In certain embodiments, the barrier layer is a ceramic coating layer 20, wherein the ceramic coating is formed of partially or fully oxidized aluminum or silicon or a blend of both. In certain embodiments, the ceramic coating 20 is formed of a partially or fully oxidized silicon ($SiO_x$, $SiO_2$), partially or fully oxidized aluminum ($AlO_x$, $Al_2O_3$), or a mixture thereof. A polymer top coating 25 is further included on the surface of the barrier layer 20 opposite the surface facing the polyester-based polymer 12. The top coating layer 25 is disposed on the ceramic coating layer 20 and is suitable for closing any cracks created during the retort process.

Figure 15:
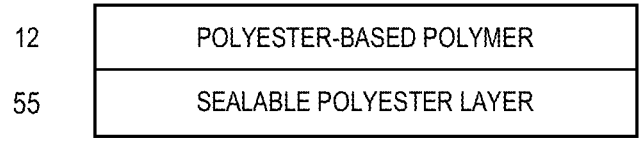
FIG. 15 illustrates an exemplary sealable polyester-based film.

FIG. 15 illustrates an exemplary sealable polyester-based film, which is operable to embody the sealable polyester-based film 50. The sealable polyester-based film 50 may comprise a polyester-based polymer layer 12 and a sealable polyester layer 55.

The present development was reduced to practice and the heat seal strength, oxygen and water vapor permeability, dimensional stability, hermetic seal pressure, package pressure, gusset opening pressure, kinetic and static coefficients of friction of sealant layer were compared to traditional PET film/foil/cast polypropylene (CPP) films (see Table 1).

TABLE 1

| | Control Body: PET/foil/CPP Gusset: PET/foil/BoN/CPP | Recycle Ready Polyester Based Gusseted Pouches |
|---|---|---|
| CoF | <0.4 | <0.4 |
| Heat Seal Strength | >30 N/25 mm | >10 N/25 mm |
| Leak test Filling with air under 0.1 bar pressure for 1 hour Rhodamine solution for 1 hour Water vacuum test under 18 in Hg for 1 min | Pass | Pass |
| Pressure test Filling the sample with water and apply 1 bar pressure for 4 hrs | Pass | Pass |
| Gusset opening | 40 mbar | <30 mbar |
| Burst test Fill with air till pouch breaks | 800 mbar | <500 mbar |
| Linear tear test | Pass | Pass |
| Internal flex crack testing (Qualitatively) | Pass | Pass |
| OTR (cc/100 in$^2$/day) (23° C., 0% RH) Before and after retort test process | <0.01 | <0.05 |
| WVTR (g/100 in$^2$/day) (38° C., 90% RH) Before and after retort test process | <0.01 | <0.05 |
| Retort Test up to 130° C., counter pressure involved | Pass | Pass |
| Dimensional Stability after retort (MD/TD %) | <2.5% | <2.5% |
| Migration testing for retort condition 130° C., 90 min | Pass | Pass |

As can be seen from Table 1, the heat seal strength is within the range of 15-100 N/25 mm required to pass the retort process, while creating a good ultrasonic seal. The oxygen and water vapor permeability values after retort processing are within the ranges to ensure that product quality and shelf life are not compromised. The dimensional stability is within the 3% maximum threshold required to ensure that a pouch formed of the film structure will have good dimensional stability and maintain the look of the pouch. The gusset opening pressure is within the 40 mBar maximum threshold for running on pouch filling equipment with no issues. The coefficients of kinetic and static friction are within a range suitable for running on pouch forming and filling equipment with no issues.

Figure 16:
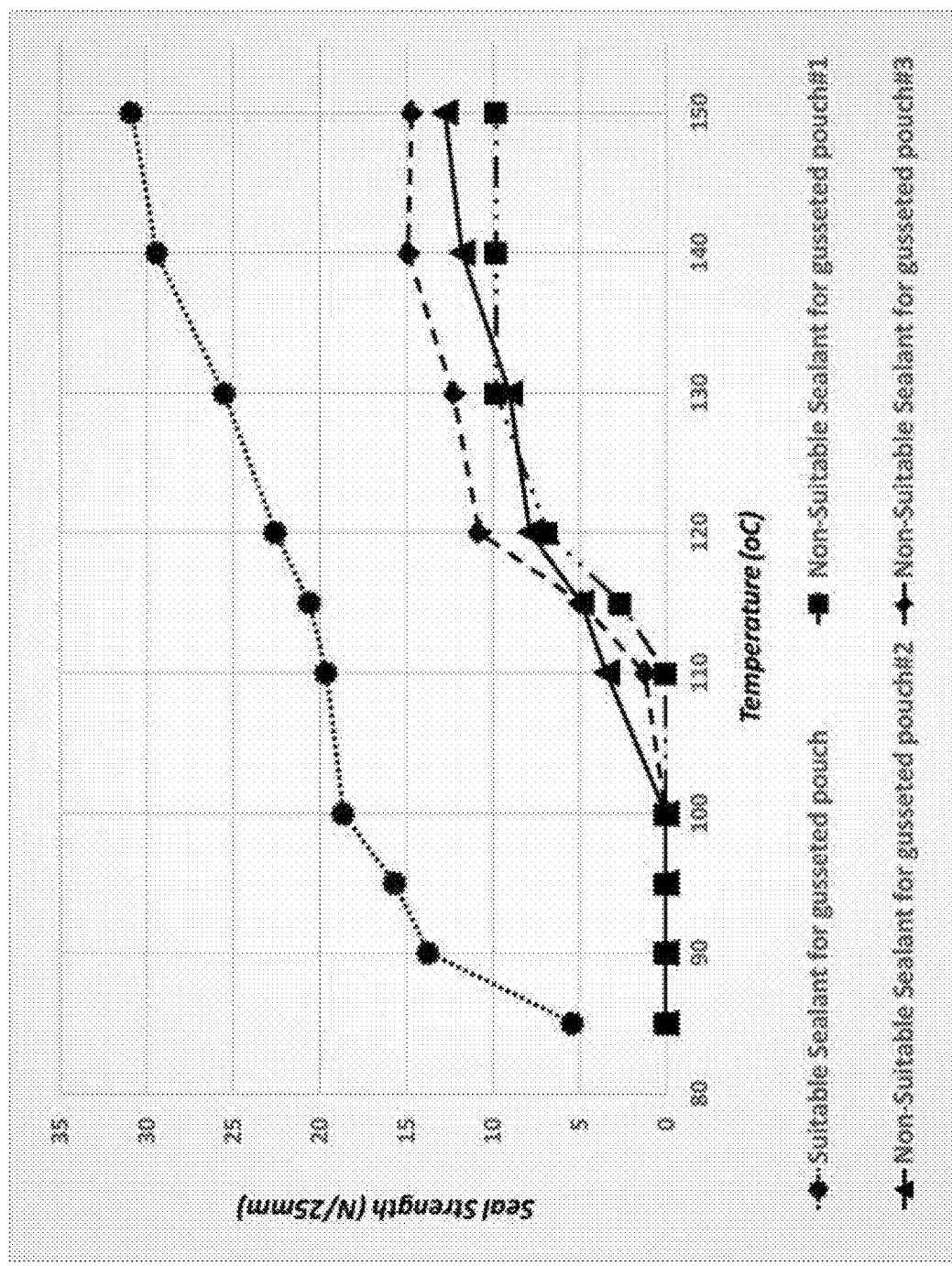
FIG. 16 is a graph of seal strength as a function of temperature comparing a gusseted standup pouches formed of polyester film using a polyester sealant layer having a low seal initiation temperature in accordance with the present invention (referred to herein as "suitable sealant") to three commercially available polyester sealant layers conventionally used for polyester pouch constructions, which have been found to be unsuitable for use with gusseted pouch constructions (referred to herein as "non-suitable sealants").

Referring now to FIG. 16, there appears a graph of seal strength as a function of temperature comparing a gusseted standup pouches formed of polyester film using a polyester sealant layer having a low seal initiation temperature in accordance with the present invention (referred to herein as "suitable sealant") to three different commercially available polyester sealant layers conventionally used for non-gusseted polyester film packaging, but which have been found to be unsuitable for use with gusseted pouch constructions (referred to herein as "non-suitable sealants"). The tests were conducted at a sealing pressure of 40 psi and a dwell time of 0.5 seconds.

As clearly seen in FIG. 16, the seal initiation temperature of the suitable sealant herein has a seal initiation of less than 100 degrees C.; whereas, the seal initiation temperature of the non-suitable sealants all above 110 degrees C. As can also be seen in FIG. 16, the sealant achieved seal strengths, e.g., in the range of 14-20 N/25 mm, at lower temperatures, e.g., in the range of about 90 to 110 degrees C., which were below the seal initiation temperatures of the unsuitable sealants. In addition, as shown in FIG. 16, at higher temperatures, the suitable sealant resulted in significantly higher seal strengths than was achievable with the unsuitable sealants.

In preparing gusseted pouches in accordance with this disclosure, the films using the unsuitable sealant layers were found not to work for gusseted pouch applications in they achieved a sealing strength of only 10N/25 mm at a sealing temperature of around 120-130 degrees C. and none of them achieved maximum seal strength. In contrast, the pouches employing the suitable sealant layer in accordance with this disclosure achieved a minimum seal strength of 10 N/25 mm at relatively low sealing temperatures, e.g., approximately 90 degrees C., and can reach a maximum seal strength when the sealing temperature is greater than or equal to 110 degrees C., wherein the maximum sealing strength is between 20 and 32 N/25 mm, including 20 N/25 mm, 30 N/25 mm, and 32 N/25 mm.

Figure 17A:
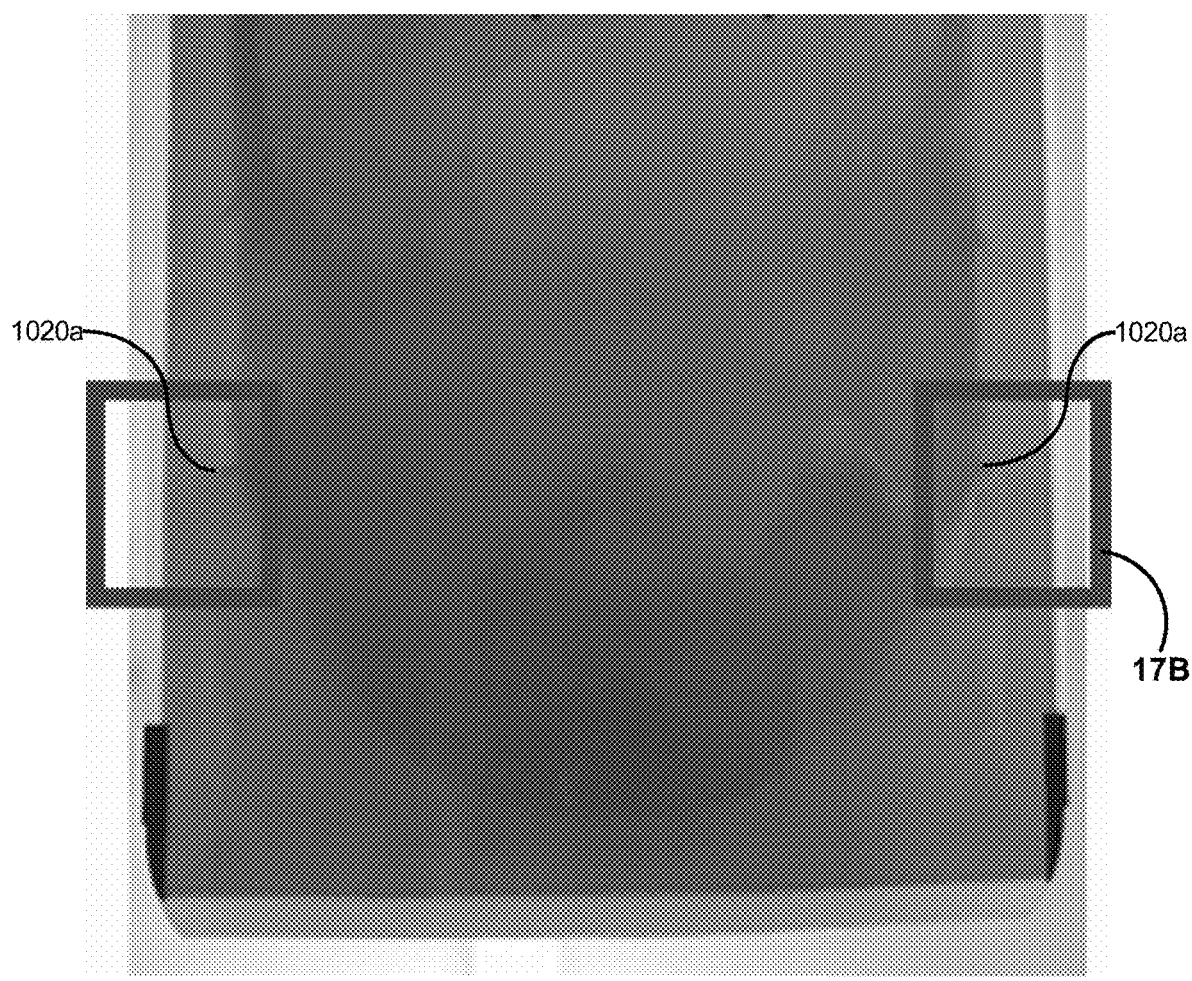
FIG. 17A is an image of an exemplary gusseted pouch constructed with polyester film having a suitable polyester sealant in accordance with this disclosure.
Figure 17B:
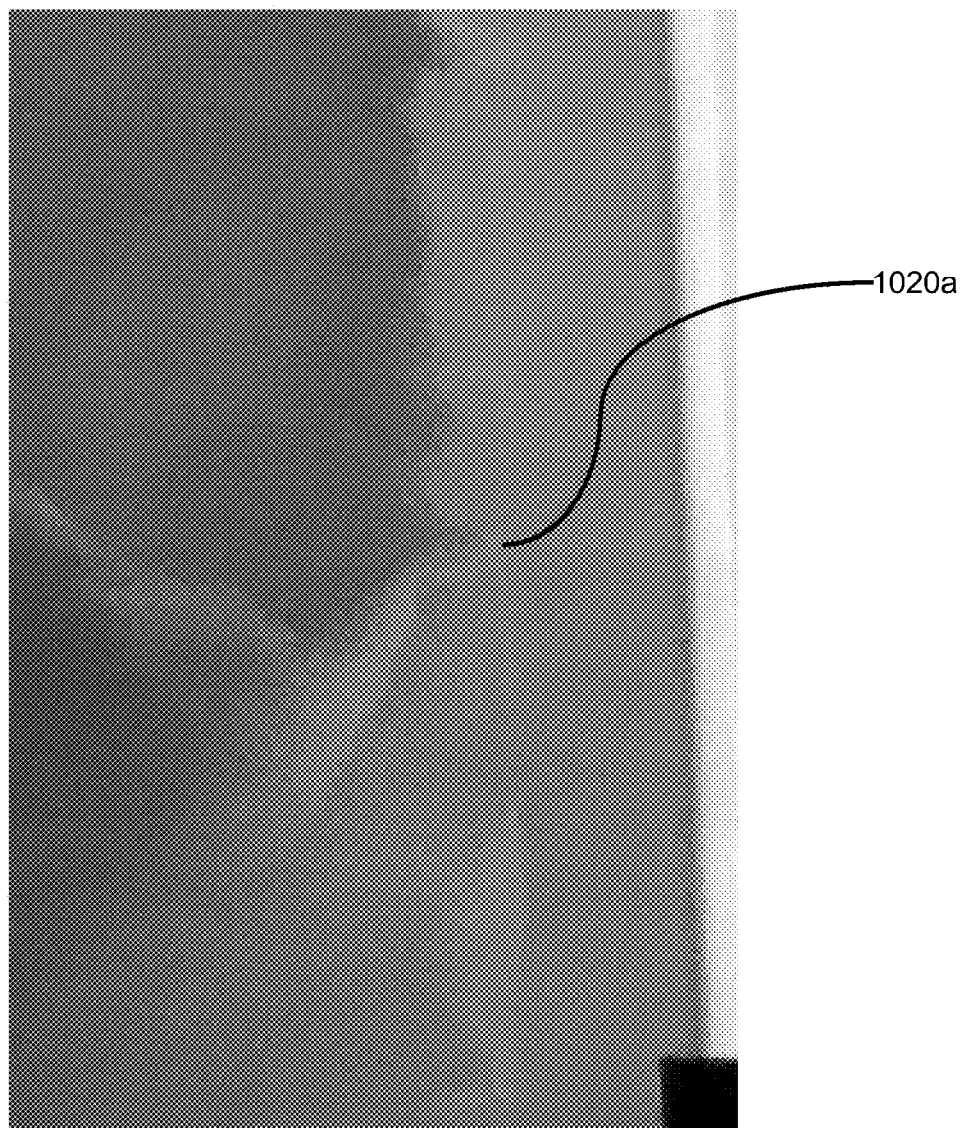
FIG. 17B is an enlarged view of the triple point region of the gusseted pouch appearing in FIG. 17A.
Figure 18A:
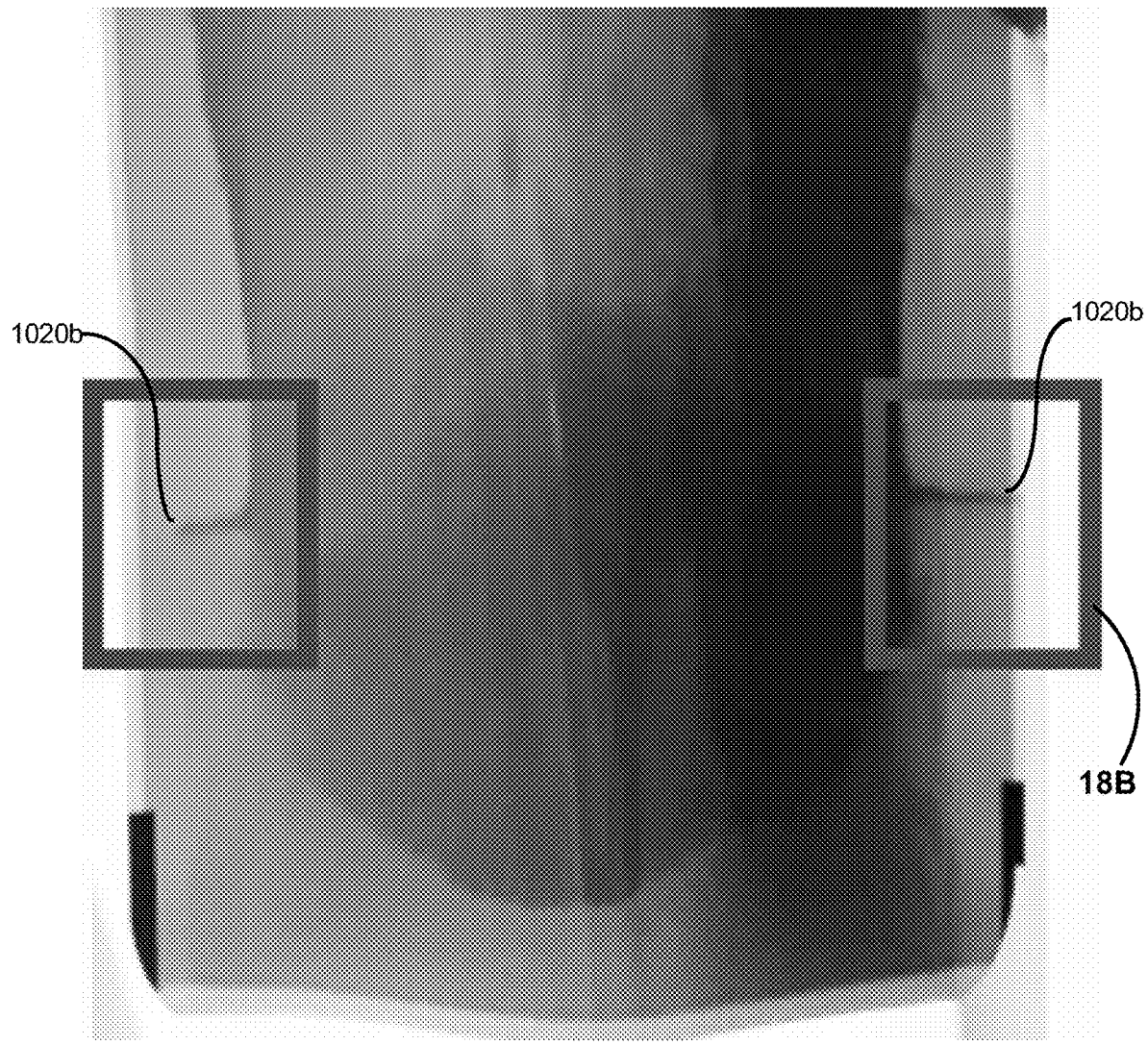
FIG. 18A is an image of a gusseted pouch constructed with polyester film having a conventional, unsuitable suitable polyester sealant.
Figure 18B:
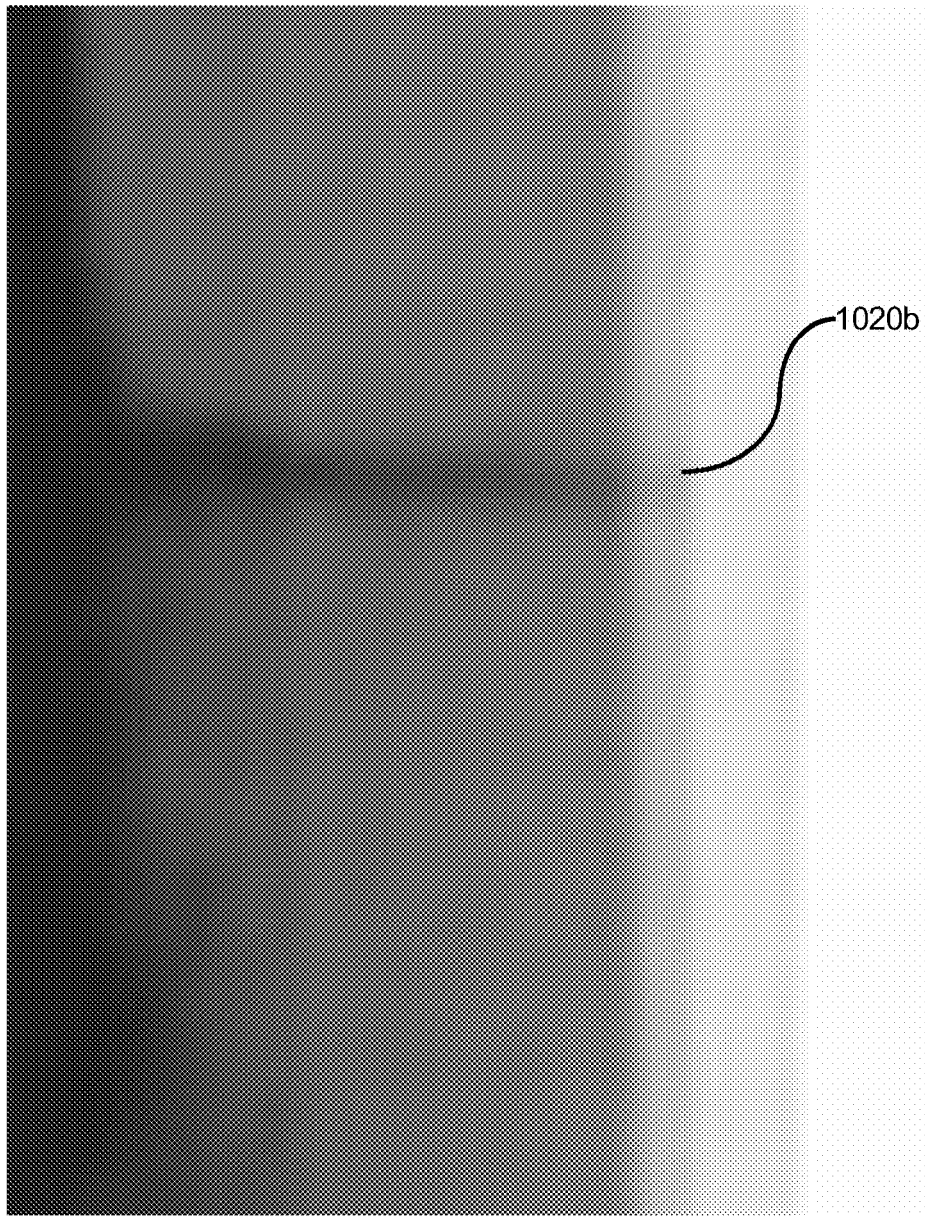
FIG. 18B is an enlarged view of the triple point region of the gusseted pouch appearing in FIG. 18A.

Referring now to FIGS. 17A and 17B, there appears an exemplary gusseted pouch constructed with polyester film having a suitable polyester sealant in accordance with this disclosure. An iodopovidone solution was used to detect leaks at the triple point regions 1020a. As can be seen in FIGS. 17A and 17B, the pouch achieved a hermetic seal at the triple point regions 1020a. FIGS. 18A and 18B are images of a gusseted pouch constructed with polyester film having a conventional, unsuitable suitable polyester sealant. An iodopovidone solution was used to detect leaks at the triple point regions 1020b. As can be seen in FIGS. 18A and 18B, the pouch using the conventional, unsuitable suitable polyester sealant did not achieve a hermetic seal at the triple point regions 1020b.

In comparing pillow shaped bags having a longitudinal fin seal, of the type disclosed in U.S. Pat. No. 6,543,208, it was found that a hermetic seal was provided at the apices (i.e., junctions between the longitudinal seal and the transverse end seals) even when using the conventional amorphous polyester sealant layers that are non-suitable for gusseted pouches, even with relatively thick and/or stiff films. Thus, it has been found that it is much easier to provide a hermetic seal at the apex of a conventional pillow shaped bag with fin seal than for the triple point in a gusseted stand-up pouch due to the extra film layer resulting from the presence of the bottom gusset panel.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A pouch comprising:
   a first panel having an upper end, a lower end, an interior surface facing an interior of the pouch, and an exterior surface at an exterior of the pouch;
   a second panel opposite the first panel, the second panel having an upper end, a lower end, an interior surface facing the interior of the pouch, and an exterior surface at the exterior of the pouch, the first and second panels cooperating to define at least a portion of a cavity, the upper ends of the first and second panels spaced apart from the lower ends of the first and second panels in an axial direction;
   a bottom gusset panel extending between the lower end of the first panel and the lower end of the second panel and defining a lower end of the cavity, the bottom gusset panel having an interior surface facing the interior of the pouch and an exterior surface at the exterior of the pouch, wherein the bottom gusset panel is folded along a fold line extending parallel to the lower ends of the first panel and the second panel when the pouch is empty, the fold line spaced apart from the lower ends of the first and second panels toward the upper ends of the first and second panels, wherein a first axial extent of the pouch between the lower ends of the first and second panels and the fold line defines a gusset region, and wherein a second axial extent of the pouch between the fold line and the upper ends of the first and second panels defines a non-gusset region, the bottom gusset panel configured to permit the lower ends of the first and second panels to be spaced apart from each other to expand a lower end of the pouch when the cavity is at least partially filled;
   a first side seal region extending in the axial direction, wherein the first and second panels are sealed to each other along a first peripheral edge of the non-gusset region and wherein the first and second panels are sealed to the bottom gusset panel along a first peripheral edge of the gusset region;
   a second side seal region extending in the axial direction and transversely opposite the first side seal region, wherein the first and second panels are sealed to each other along a second peripheral edge of the non-gusset region and wherein the first and second panels are sealed to the bottom gusset panel along a second peripheral edge of the gusset region;
   a first bottom seal region wherein the first panel is sealed to the bottom gusset panel along a bottom peripheral edge of the gusset region;
   a second bottom seal region wherein the second panel is sealed to the bottom gusset panel along the bottom peripheral edge of the gusset region;
   a seal region at an upper end of the pouch that is configured to close the cavity when sealed;
   wherein the first panel, second panel, and bottom gusset panel are formed of a polyester-based film structure; and
   wherein one or more of the first panel, second panel, and bottom gusset panel are formed of a multi-ply film structure comprising:
   a first ply comprising:
      a first layer formed of a first polyester-based polymeric composition, wherein the first polyester-based polymeric composition comprises polybutylene terephthalate, polyethylene terephthalate, or a blend thereof, the first layer having a first surface and a second surface opposite the first surface;

a second ply comprising:
  a second layer, the second layer having a first surface and a second surface opposite the first surface, and wherein the second layer is a sealable polyester layer;
  a third layer formed of a second polyester-based polymeric composition, wherein the second polyester-based polymeric composition comprises polybutylene terephthalate, polyethylene terephthalate, or a blend thereof;
  a fourth layer formed of a ceramic coating, the fourth layer having a first surface and a second surface opposite the first surface, wherein the first surface of the fourth layer faces the adhesive layer; and
  a fifth layer, the fourth layer interposed between the fifth layer and the third layer; and
an adhesive layer interposed between the first ply and the second ply, the adhesive layer laminating the first ply to the second ply, wherein the first surface of the third layer faces the second surface of the first layer.

2. The pouch of claim 1, wherein the bending stiffness of the bottom gusset panel is less than or equal to 0.05 N/mm.

3. The pouch of claim 1, wherein each of the first ply and the second ply have a thickness in the range of about 9 microns to 100 microns.

4. The pouch of claim 1, wherein the sealable polyester layer has a thickness in the range of about 2 microns to 25 microns.

5. The pouch of claim 1, wherein the multi-pLy film structure has a seal initiation temperature of less than or equal to 120° C.

6. The pouch of claim 1, wherein the multi-pLy film structure has a seal initiation temperature of less than or equal to 100° C.

7. The pouch of claim 1, wherein the multi-ply film structure has a heat seal strength in the range of about 10 N/25 mm to about 100 N/25 mm.

8. The pouch of claim 1, wherein the multi-ply film structure has an ultrasonic seal strength in the range of about 10 N/25 mm to about 100 N/25 mm.

9. The pouch of claim 1, wherein the multi-ply film structure has a maximum seal strength in the range of about 10 N/25 mm to about 100 N/25 mm.

10. The pouch of claim 1, wherein the minimum seal temperature to achieve a seal strength of at least 10 N/25 mm in the range of about 90 degrees C to about to 115 degrees C.

11. The pouch of claim 1, wherein the sealable polyester layer has a static coefficient of friction in the range of about 0.1 to 0.4 and a kinetic coefficient of friction in the range of about 0.1 to 0.4.

12. The pouch of claim 1, wherein:
the polyester-based film structure has an oxygen transmission rate before undergoing a retort process in the range of about 0.1 cc/100 in$^2$/day at 23 degrees C. and 0% relative humidity to about 0.05 cc/100 in$^2$/day at 23 degrees C. and 0% relative humidity; and
the polyester-based film structure has a moisture vapor transmission rate before undergoing a retort process in the range of about 0.1 g/100 in$^2$/day at 38 degrees C. and 90% relative humidity and about 0.05 g/100 in$^2$/day at 38 degrees C. and 90% relative humidity.

13. The pouch of claim 1, wherein:
the polyester-based film structure has an oxygen transmission rate after undergoing a retort process in the range of about 0.1 cc/100 in$^2$/day at 23 degrees C. and 0% relative humidity to about 0.05 cc/100 in$^2$/day at 23 degrees C. and 0% relative humidity; and
the polyester-based film structure has a moisture vapor transmission rate after undergoing a retort process in the range of about 0.1 g/100 in$^2$/day at 38 degrees C. and 90% relative humidity to about 0.05 g/100 in$^2$/day at 38 degrees C. and 90% relative humidity.

14. The pouch of claim 1, wherein the multi-ply film structure further comprises a printed layer disposed intermediate the first layer and the adhesive layer.

15. The pouch of claim 14, wherein the fifth layer is interposed between the third layer and the printed layer.

16. The pouch of claim 1, wherein the multi-ply film structure has a minimum seal strength in the range of about 10 N/25 mm to about 20 N/25 mm.

17. The pouch of claim 16, wherein the minimum seal temperature to achieve said minimum seal strength is in the range of about 90 degrees C. to about 115 degrees C.

18. A pouch comprising:
a first panel having an upper end, a lower end, an interior surface facing an interior of the pouch, and an exterior surface at an exterior of the pouch;
a second panel opposite the first panel, the second panel having an upper end, a lower end, an interior surface facing the interior of the pouch, and an exterior surface at the exterior of the pouch, the first and second panels cooperating to define at least a portion of a cavity, the upper ends of the first and second panels spaced apart from the lower ends of the first and second panels in an axial direction;
a bottom gusset panel extending between the lower end of the first panel and the lower end of the second panel and defining a lower end of the cavity, the bottom gusset panel having an interior surface facing the interior of the pouch and an exterior surface at the exterior of the pouch, wherein the bottom gusset panel is folded along a fold line extending parallel to the lower ends of the first panel and the second panel when the pouch is empty, the fold line spaced apart from the lower ends of the first and second panels toward the upper ends of the first and second panels, wherein a first axial extent of the pouch between the lower ends of the first and second panels and the fold line defines a gusset region, and wherein a second axial extent of the pouch between the fold line and the upper ends of the first and second panels defines a non-gusset region, the bottom gusset panel configured to permit the lower ends of the first and second panels to be spaced apart from each other to expand a lower end of the pouch when the cavity is at least partially filled:
a first side seal region extending in the axial direction, wherein the first and second panels are sealed to each other along a first peripheral edge of the non-gusset region and wherein the first and second panels are sealed to the bottom gusset panel along a first peripheral edge of the gusset region;
a second side seal region extending in the axial direction and transversely opposite the first side seal region, wherein the first and second panels are sealed to each other along a second peripheral edge of the non-gusset region and wherein the first and second panels are sealed to the bottom gusset panel along a second peripheral edge of the gusset region;
a first bottom seal region wherein the first panel is sealed to the bottom gusset panel along a bottom peripheral edge of the gusset region;

a second bottom seal region wherein the second panel is sealed to the bottom gusset panel along the bottom peripheral edge of the gusset region;

a seal region at an upper end of the pouch that is configured to close the cavity when sealed;

wherein the first panel, second panel, and bottom gusset panel are formed of a polyester-based film structure; and wherein one or more of the first panel, second panel, and bottom gusset panel are formed of a multi-ply film structure comprising:

a first ply comprising:
   a first layer formed of a first polyester-based polymeric composition, wherein the first polyester-based polymeric composition comprises polybutylene terephthalate, polyethylene terephthalate, or a blend thereof, the first layer having a first surface and a second surface opposite the first surface; and a second ply comprising:
   a second layer, the second layer having a first surface and a second surface opposite the first surface, and wherein the second layer is sealable polyester layer; and
   a third layer formed of a second polyester-based polymeric composition, wherein the second polyester-based polymeric composition comprises polybutylene terephthalate, polyethylene terephthalate, or a blend thereof; and a third ply comprising:
   a fourth layer formed of a third polyester-based polymeric composition, the fourth layer having a first surface and a second surface opposite the first surface;

a first adhesive layer interposed between the first ply and the third ply, the adhesive layer laminating the first ply to the third ply, wherein the first surface of the fourth layer faces the second surface of the first layer; and a second adhesive layer interposed between the second ply and the third ply, the second adhesive layer laminating the second ply to the third ply, wherein the second surface of the fourth layer faces the first surface of the third layer.

19. The pouch of claim 18, wherein the third polyester-based polymeric composition comprises polybutylene terephthalate, polyethylene terephthalate, or a blend thereof.

20. The pouch of claim 18, wherein the multi-ply film structure further comprises a printed layer disposed intermediate the fourth layer and the second adhesive layer.

21. The pouch of claim 18, wherein each of the first ply, third ply, and the second ply have a thickness in the range of about 9 microns to 100 microns.

22. The pouch of claim 18, wherein the sealable polyester layer has a thickness in the range of about 2 microns to 25 microns.

23. The pouch of claim 18, wherein the second ply further comprises:
   a fifth layer formed of a ceramic coating, the fifth layer having a first surface and a second surface opposite the first surface, wherein the first surface of the fifth layer faces the second adhesive layer; and
   a sixth layer, the sixth layer interposed between the fifth layer and the second adhesive layer.

24. The pouch of claim 18, wherein the sealable polyester layer has a static coefficient of friction in the range of about 0.1 to 0.4 and a kinetic coefficient of friction in the range of about 0.1 to 0.4.

25. The pouch of claim 18, wherein the bending stiffness of the bottom gusset panel is less than or equal to 0.05 N/mm.

26. The pouch of claim 18, wherein the multi-ply film structure further comprises a printed layer disposed intermediate the second layer and the adhesive layer.

27. The pouch of claim 18, wherein the first ply further comprises:
   a fifth layer formed of a ceramic coating, the fifth layer having a first surface and a second surface opposite the first surface, wherein the first surface of the fifth layer faces the second surface of the first layer; and
   a sixth layer, the sixth layer interposed between the first layer and the first adhesive layer.

* * * * *